(12) United States Patent
Harrison et al.

(10) Patent No.: US 6,906,011 B2
(45) Date of Patent: Jun. 14, 2005

(54) POLYMERIC DISPERSANTS PREPARED FROM COPOLYMERS OF LOW MOLECULAR WEIGHT POLYISOBUTENE AND UNSATURATED ACIDIC REAGENT

(75) Inventors: James J. Harrison, Novato, CA (US); William R. Ruhe, Jr., Benicia, CA (US); Kenneth D. Nelson, Clearlake, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 411 days.

(21) Appl. No.: 10/006,817

(22) Filed: Nov. 9, 2001

(65) Prior Publication Data

US 2003/0130140 A1 Jul. 10, 2003

(51) Int. Cl.[7] .................. C10M 149/06; C10L 1/22; C08F 222/00
(52) U.S. Cl. .................. 508/192; 508/222; 508/232; 508/291; 508/293; 44/317; 44/331; 44/346; 526/262; 526/272; 526/318.25; 526/329
(58) Field of Search ................. 508/306, 291, 508/293, 192

(56) References Cited

U.S. PATENT DOCUMENTS

| | | | |
|---|---|---|---|
| 3,219,666 A | 11/1965 | Norman et al. | |
| 3,361,673 A | 1/1968 | Stuart et al. | |
| 3,381,022 A | 4/1968 | Le Suer | |
| 3,455,827 A | 7/1969 | Mehmedbasich et al. | |
| 3,461,108 A | 8/1969 | Heilman et al. | |
| 3,560,455 A | 2/1971 | Hazen et al. | |
| 3,560,456 A | 2/1971 | Hazen et al. | |
| 3,560,457 A | 2/1971 | Hazen et al. | |
| 3,580,893 A | 5/1971 | Heilman et al. | |
| 3,706,704 A | 12/1972 | Heilman et al. | |
| 3,729,450 A | 4/1973 | Galiano et al. | |
| 3,729,451 A | 4/1973 | Blecke et al. | |
| 4,112,507 A | 9/1978 | White et al. | |
| 4,234,435 A | 11/1980 | Meinhardt et al. | |
| 5,112,507 A | 5/1992 | Harrison | |
| 5,175,225 A | 12/1992 | Ruhe, Jr. | |
| 5,266,186 A | 11/1993 | Kaplan | |
| 5,512,507 A | 4/1996 | Hong | |
| 5,565,528 A | 10/1996 | Harrison et al. | |
| 5,616,668 A | 4/1997 | Harrison et al. | |
| 5,670,462 A | 9/1997 | Barr | |
| 5,716,912 A | 2/1998 | Harrison et al. | |
| 5,719,108 A | 2/1998 | Wilby et al. | |
| 5,821,205 A | 10/1998 | Harrison et al. | |
| 5,849,676 A | 12/1998 | Harrison et al. | |
| 5,851,965 A | 12/1998 | Harrison et al. | |
| 5,853,434 A | 12/1998 | Harrison et al. | |
| 5,872,083 A | 2/1999 | Harrison et al. | |
| 6,015,776 A | * 1/2000 | Harrison et al. | 508/192 |
| 6,107,450 A | 8/2000 | Harrison et al. | |
| 6,358,892 B1 | * 3/2002 | Harrison et al. | 508/192 |

* cited by examiner

Primary Examiner—Ellen M McAvoy
(74) Attorney, Agent, or Firm—Sarita R. Kelley; Linda A. Stokley

(57) ABSTRACT

This invention is directed to a new low molecular weight copolymer (The PIB/UAR copolymer) that may be prepared by reacting a low molecular weight polyisobutene (PIB) having less than about 32 carbon atoms with an unsaturated acidic reagent in the presence of a free radical initiator. No chain transfer agent is required to prepare the low molecular weight PIB/UAR copolymer. The PIB/UAR copolymer may be useful as is, or as an intermediate for (1) polysuccinimides, (2) detergents or dispersants for lube oil or fuels, (3) pour point depressants and (4) surface sizing agents for paper. The PIB/UAR copolymer may be used by itself or as the ester, amide, imide or metal salt derivative of the PIB/UAR copolymer. The PIB/UAR copolymer may be liquid at ambient temperature.

46 Claims, 1 Drawing Sheet

POLYMERIC DISPERSANTS PREPARED FROM COPOLYMERS OF LOW MOLECULAR WEIGHT POLYISOBUTENE AND UNSATURATED ACIDIC REAGENT

BACKGROUND OF THE INVENTION

This invention is directed to a new low molecular weight copolymer (The PIB/UAR copolymer) that may be prepared by reacting a low molecular weight polyisobutene (PIB) having less than about 32 carbon atoms with an unsaturated acidic reagent in the presence of a free radical initiator. No chain transfer agent is required to prepare the low molecular weight PIB/UAR copolymer. The PIB/UAR copolymer may be useful as is, or as an intermediate for (1) polysuccinimides, (2) detergents or dispersants for lube oil or fuels, (3) pour point depressants and (4) surface sizing agents for paper. The PIB/UAR copolymer may be used by itself or as the ester, amide, imide or metal salt derivative of the PIB/UAR copolymer. Preferred PIB/UAR copolymers are liquid at ambient temperature.

It is known that olefin/unsaturated acidic reagent copolymer compositions may be prepared by reacting an alpha olefin with an unsaturated acidic reagent in the presence of a free radical initiator. This reaction is typically carried out at elevated temperatures either neat or in a solvent or diluent. When the reaction is carried out neat, the resultant copolymers have a high degree of polymerization, which results in a high carbon number and a high molecular weight.

Traditionally, if a lower degree of polymerization, lower carbon number or low molecular weight for a copolymer was desired; it was necessary to use a chain transfer agent during the copolymer preparation to promote chain transfer. This is because the chain transfer agent causes such copolymers to have a lower degree of polymerization, which results in a lower carbon number and a lower molecular weight.

A high temperature of reaction may be used alone or in combination with chain transfer agents to encourage a low degree of polymerization and the resulting low carbon number and low molecular weight. Traditionally, the key factors used to influence the degree of polymerization for a copolymerization reaction were combining high temperature and particular chain transfer agents selected for the degree of polymerization they impart.

One draw back to using an alpha olefin to prepare the copolymer is that the resulting copolymer is typically a glassy solid. A solid copolymer is undesirable because a solid copolymer cannot be handled easily or pumped readily at ambient temperatures. Before further processing, a solid copolymer has to be brought to a consistency that may be pumped readily. This may be accomplished by heating the solid copolymer to a temperature above the melting point or using a solvent to dissolve it. Heating the copolymer is often costly, and the addition of a solvent is often not practical. This is because it is desirable to remove the solvent before the copolymer can be used, and the solvent has to be disposed of in a manner consistent with environmental regulations.

The PIB/UAR copolymer is an improvement over alpha olefin copolymers in two respects. Surprisingly, a chain transfer agent is not required to prepare the PIB/UAR copolymer at the desired low molecular weight. Further, since the PIB/UAR copolymer is liquid, it is not necessary to dissolve the PIB/UAR copolymer by using additional heat or adding solvent before the PIB/UAR copolymer is used. Since no solvent is required, the step of removing the solvent is not necessary either.

Preparing a polysuccinimide by reacting a PIB/UAR copolymer with a polyamine and an alkenyl or alkyl succinic acid derivative offers several advantages over preparing a polysuccinimide by reacting alpha olefin prepared copolymers with polyamines and alkenyl or alkyl succinic acid derivative. These advantages include: (1) no chain transfer agent is required to produce the PIB/UAR copolymer having the desired low molecular weight, and (2) since the PIB/UAR copolymer is liquid, it does not require melting or the addition of a solvent before it can be used to make a polysuccinimide and (3) since solvent is not required, the solvent does not have to be removed thus eliminating handling or disposal cost.

SUMMARY OF THE INVENTION

This invention is directed to a new low molecular weight copolymer (The PIB/UAR copolymer) that may be prepared by reacting a low molecular weight polyisobutene (PIB) having less than about 32 carbon atoms with an unsaturated acidic reagent in the presence of a free radical initiator. No chain transfer agent is required to prepare the low molecular weight PIB/UAR copolymer. The PIB/UAR copolymer may be useful as is, or as an intermediate for (1) polysuccinimides, (2) detergents or dispersants for lube oil or fuels, (3) pour point depressants and (4) surface sizing agents for paper. The PIB/UAR copolymer may be used by itself or as the ester, amide, imide, or metal salt derivative of the PIB/UAR copolymer. The PIB/UAR copolymer may be liquid at ambient temperature.

This invention comprises one or more PIB/UAR copolymers having the general formula:

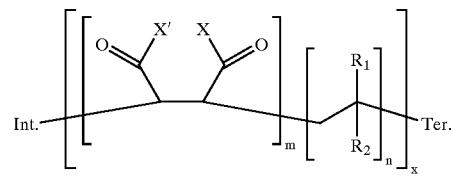

wherein
X and X' comprise one or more of: —OH; —O—hydrocarbyl; —NH2; —Cl; —Br; —OM+, wherein M+ comprises one equivalent of at least one of a metal, ammonium and amine cation; and X and X' taken together as —O—; n comprises a whole integer from 1 to 3; R1 comprises methyl; R2 comprises polyisobutyl having less than 32 carbon atoms; m comprises a whole integer of from 1 to 3; x comprises a whole integer of from 1 to 20; Int. comprises at least one initiating radical; and Ter. comprises at least one terminating group. The PIB/UAR copolymer may include either R1 and R2 that comprises methyl and the other of R1 and R2 that comprises polyisobutyl having about 5 to about 25 carbon atoms. The PIB/UAR copolymer may be liquid at ambient temperature. The PIB/UAR copolymer may comprise one or more of an amide derivative, an ester derivative, an imide derivative and a metal salt derivative. The PIB/UAR copolymer may have an average degree of polymerization of about 1.1 to about 20. The PIB/UAR copolymer may have a number average molecular weight of about 231 to about 10,920.

The PIB/UAR copolymer may be prepared by the polymerization of one or more unsaturated acidic reagents and one or more polyisobutenes having less than about 32 carbon atoms in the presence of one or more free radical initiators. This unsaturated acidic reagent may comprise maleic anhydride. The polyisobutene may comprises a mixture further comprising about 5 wt. % to about 20 wt. % $C_8H_{16}$; about 35 wt. % to about 55 wt. % $C_{12}H_{24}$; about 20 wt. % to about 30 wt. % $C_{16}H_{32}$; about 8 wt. % to about 15 wt. % $C_{20}H_{40}$; about 2 wt % to about 8 wt % $C_{24}H_{48}$; and about 0.5 wt % to about 2 wt. % $C_{28}H_{56}$. The polyisobutene may also comprise a mixture having a number average molecular weight ($M_n$) of about 150 to about 240. The PIB/UAR copolymer may be prepared by performing a first step of reacting a first amount of unsaturated acidic reagent with a first amount of polyisobutene having less than about 32 carbon atoms, more preferably less than about 28 carbon atoms, in the presence of a first amount of free radical initiator to form a first liquid PIB/UAR copolymer and a second step of reacting a portion of the first liquid PIB/UAR copolymer with a second amount of unsaturated acidic reagent, a second amount of polyisobutene having less than about 32 carbon atoms, more preferably less than about 28 carbon atoms, in the presence of a second amount of free radical initiator.

The PIB/UAR copolymer of this invention may also comprise one or more copolymers having the general formula:

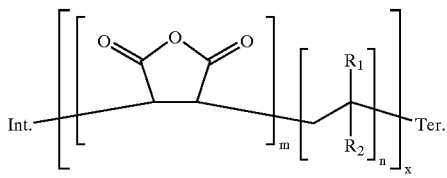

wherein n comprises a whole integer from 1 to 3, $R_1$ comprises methyl, $R_2$ comprises polyisobutyl having less than 32 carbon atoms, m comprises a whole integer of from 1 to 3, x comprises a whole integer of from 1 to 20, Int. comprises one or more initiating radicals and Ter. comprises one or more terminating groups. $R_1$ and $R_2$ may also comprise methyl and the other of $R_1$ and $R_2$ may comprise one or more polyisobutyls having about 5 to about 25 carbon atoms. This PIB/UAR copolymer may be liquid at ambient temperature. This PIB/UAR copolymer may be prepared by reacting maleic anhydride with one or more polyisobutenes having less than about 32 carbon atoms, more preferably 28 carbon atoms, in the presence of one or more free radical initiators. This PIB/UAR copolymer may have an average degree of polymerization of about 1.1 to about 20, more preferably about 1.5 to about 10 and average molecular weight of about 231 to about 10,920. The polyisobutene used to make this PIB/UAR copolymer may comprise about 5 wt. % to about 20 wt. % $C_8H_{16}$, about 35 wt. % to about 55 wt. % $C_{12}H_{24}$, about 20 wt. % to about 30 wt. % $C_{16}H_{32}$, about 8 wt. % to about 15 wt. % $C_{20}H_{40}$, about 2 wt % to about 8 wt % $C_{24}H_{48}$, and about 0.5 wt % to about 2 wt. % $C_{28}H_{56}$. The polyisobutene used to make this PIB/UAR copolymer may have a number average molecular weight ($M_n$) of about 150 to about 240. This PIB/UAR copolymer may be used with polyisobutene having less than about 32 carbon atoms with maleic anhydride in the presence of one or more free radical initiators to make more of this copolymer. This PIB/UAR copolymer may be prepared by performing a first step of reacting a first amount of unsaturated acidic reagent with a first amount of polyisobutene having less than about 32 carbon atoms, more preferably about 28 carbon atoms, in the presence of a first amount of free radical initiator to form a first liquid PIB/UAR copolymer and a second step of reacting a portion of the first liquid PIB/UAR copolymer with a second amount of unsaturated acidic reagent, a second amount of polyisobutene having less than about 32 carbon atoms, more preferably less than about 28 carbon atoms, in the presence of a second amount of free radical initiator.

This invention may also comprise one or more polymers having the general formula of:

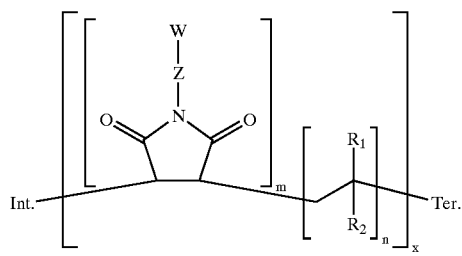

wherein W comprises one or more of:

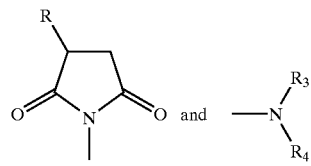

wherein R comprises at least one of one or more polyalkyls and one or more polyalkenes wherein the polyalkyls and polyalkenes each have a molecular weight of at least 1000; R1 comprises methyl; R2 comprises polyisobutyl having less than 32 carbon atoms; Z comprises one or more polyamine linking radicals; m comprises a whole integer of from 1 to 3; n comprises a whole integer of from 1 to 3; x comprises a whole integer of from 1 to 20; Int. comprises one or more initiating radicals; Ter. comprises one or more terminating groups; and wherein R3 and R4 are independently hydrogen, alkyl, phenyl, or taken together are alkylene to give a ring group. This polymer may be a part of a lubricating oil composition comprising a major amount of oil of lubricating viscosity and a minor amount of this polymer. This polymer may also be a part of a lubricating oil concentrate comprising from about 10 wt. % to about 90 wt. % of this polymer and from about 90 wt. % to about 10 wt. % of an oil of lubricating viscosity. This polymer may also be a part of a fuel concentrate comprising a major amount of an inert stable oleophilic organic solvent boiling in the range of about 150 degrees F. to about 400 degrees F. and a minor amount of this polymer. This PIB/UAR copolymer may also be post treated with one or more cyclic carbonates or one or more linear mono- or poly-carbonates under reactive conditions to form one or more post-treated dispersants. A preferred cyclic carbonate is ethylene carbonate. This post-treated dispersant may be a part of a lubricating oil comprising a minor amount of the post-treated dispersant and a major amount of an oil of lubricating viscosity. The lubricating oil concentrate may comprise from about 10 wt. % to about 90 wt. % of this post-treated dispersant and from 90 wt. % to about 10 wt. % of an oil of lubricating viscosity. The polymer may also be post-treated with one or more of boron oxide, boron halide, boric acid, and esters of boric acid under reactive conditions to form one or more post-treated dispersants.

A process for preparing one or more succinimides comprising reacting a mixture under reactive conditions in the presence of one or more free radical initiators, wherein the mixture comprises one or more of at least one alkenyl acid derivative and at least one alkylsuccinic acid derivative and one or more PIB/UAR copolymers prepared by reacting one or more unsaturated acidic reagents with one or more polyisobutenes having less than about 32 carbon atoms and one or more polyamines. The acid derivative may have a succination ratio of about from 1.1 to about 1.4. This succinimide may be prepared by reacting a mixture under reactive conditions wherein the mixture comprises one or more of an alkenyl acid derivative and an alkylsuccinic acid derivative, one or more copolymers of one or more unsaturated acidic reagents and one or more polyisobutenes having less than about 32 carbon atoms, and one or more polyamines. This succinimide may comprise one or more acid derivatives that have a succination ratio of about from about 1.1 to about 1.4. The unsaturated acidic reagent may comprise maleic anhydride. This invention may comprise a lubricating oil composition comprising a major amount of an oil of lubricating viscosity and a minor amount of this succinimide, more particularly, about 10 wt. % to about 90 wt. % of this succinimide and from about 90 wt. % to about 10 wt. % of an oil of lubricating viscosity. This invention may comprise one or more fuel concentrates that comprise a major amount of an inert stable oleophilic organic solvent boiling in the range of about 150 degrees F. to about 400 degrees F. and a minor amount of this succinimide.

This succinimide may be post-treated with one or more of the following carbonates, linear mono- carbonates and polycarbonates, under reactive conditions. The carbonates may comprise ethylene carbonate. This invention may comprise a lubricating oil comprising a major amount of an oil of lubricating viscosity and a minor amount of this post-treated succinimide, or more particularly, about 10 wt. % to about 90 wt. % of this post-treated succinimide and from about 90 wt. % to about 10 wt. % of an oil of lubricating viscosity. This invention may also comprise a fuel concentrate comprising a major amount of an inert stable oleophilic organic solvent boiling in the range of about 150 degrees F. to about 400 degrees F. and a minor amount of this post-treated succinimide.

This invention may comprise one or more post-treated succinimides prepared by treating succinimides under reactive conditions with a one or more of boron oxide, boron halide, boric acid, and esters of boric acid. The succinimides of this invention may also be post-treated with one or more of boron oxide, boron halide, boric acid, and esters of boric acid. This invention may also comprise lubricating oil comprising a major amount of oil of lubricating viscosity and a minor amount of the succinimide post treated with a boron compound. This invention may comprise a fuel concentrate comprising a major amount of an inert stable oleophilic organic solvent boiling in the range of about 150 degrees F. to about 400 degrees F. and a minor amount of this succinimide that has been post treated with one or more boron compounds.

BRIEF DESCRIPTION OF THE DRAWING

To assist the understanding of this invention, reference will be made to the formulas presented throughout and in FIG. 1. The formulas are exemplary only, and should not be construed as limiting the invention.

DEFINITIONS

Figure 1:
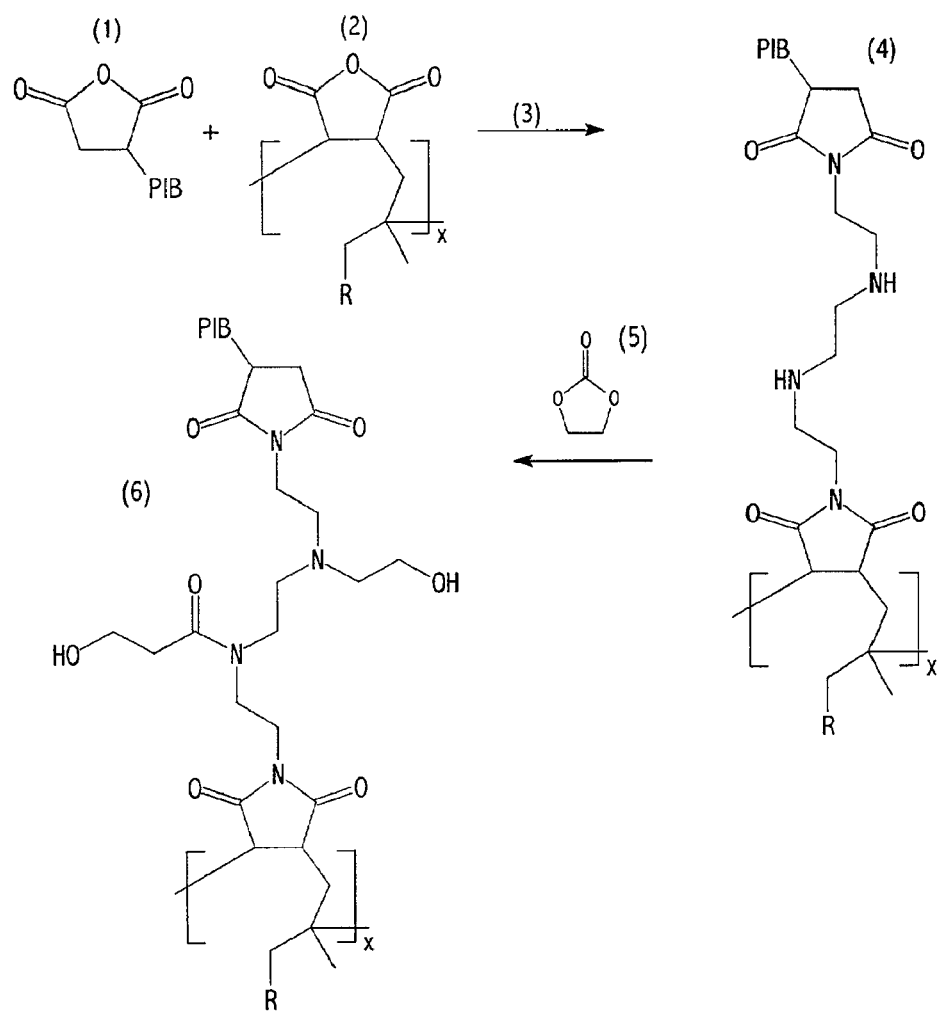
FIG. 1 depicts one embodiment of a (1) PIBSA reacted with a (2) PIB/UAR copolymer having a (R) low molecular weight polyisobutyl group in the presence of (3) triethylenetetraamine (TETA) at 165 degrees C. to form a (4) polysuccinimide. This polysuccinimide may be post-treated with (5) cyclic carbonate to yield a (6) post-treated polysuccinimide.

As used in this patent application, whether or not capitalized, the following terms have the following meanings unless specifically stated otherwise.

The term "PIB" is an abbreviation for polyisobutene.

The terms "low molecular weight PIB" refers herein to PIBs that comprise less than about 32 carbons atoms.

The terms "low molecular weight PIB/UAR copolymer" or "PIB/UAR copolymer" refers to a copolymer prepared using low molecular weight PIB.

The term "degree of polymerization" expresses the length of a linear polymer and refers to the number of repeating (monomeric) units in the chain. The number average molecular weight of a polymer is the product of the degree of polymerization and the number average molecular weight of the repeating unit (monomer). Accordingly, the average degree of polymerization is calculated by dividing the number average molecular weight of the polymer by the number average molecular weight of the repeating unit.

The term "polysuccinimide" refers to a succinimide comprising the reaction product of a copolymer with an alkyl or alkenyl succinic acylating agent and a polyamine.

The term "alkylvinylidene" or "alkylvinylidene isomer" refers to olefins and polyalkylene components having the following vinylidene structure

(A)

wherein R is polyisobutyl having less than about 29 carbon atoms and R' is lower an alkyl of about 1 to about 6 carbon atoms.

The term "chain transfer agent" means an agent that will provide an active hydrogen or halogen that can be abstracted during a polymerization reaction. Chain transfer reactions stop a growing chain radical and start a new one in its place. Thus chain transfer results in shorter chains, lower degree of polymerization and lower molecular weights. Typical chain transfer agents may include mercaptans, aromatic compounds with benzylic hydrogens, halogenated hydrocarbons such as carbon tetrachloride and carbon tetrabromide The term "succinimide" is understood in the art to include many of the amide, imide, etc. species that are also formed by the reaction of a succinic anhydride with an amine. The predominant products, however, are succinimides and this term has been generally accepted as meaning the product of a reaction of alkenyl- or alkyl-substituted succinic acid or anhydride with polyamine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference.

The term "Total Base Number" or "TBN" refers to the amount of base equivalent to milligrams of KOH in 1 gram of sample. Thus, higher TBN numbers reflect more alkaline products and therefore a greater alkalinity reserve. The TBN of a sample may be determined by ASTM Test No. D2896 or any other equivalent procedure.

The term "SAP" refers to Saponification Number and may be determined by the procedure described in ASTM D94 or any other equivalent procedure.

The term "TAN" refers to Total Acid Number and may be determined by the procedure described in ASTM D 664 or any other equivalent procedure.

The "succinic ratio" may be calculated from the saponification number (mg KOH per gram of sample), the actives content of the alkenyl or alkyl succinic anhydride product and the molecular weight of the starting polyolefin. The actives content of the alkenyl or alkyl succinic anhydride product is measured in terms of the actives fraction, wherein an actives fraction of 1.0 is equivalent to 100 weight percent actives. Accordingly, an actives fraction of 0.5 would correspond to 50 weight percent actives.

The succinic ratio of the alkenyl or alkyl succinic anhydride product of maleic anhydride and polyolefin can be calculated in accordance with the following equation:

$$\text{Succinic ratio} = \frac{M_{po} \times P}{(C \times A) - (M_{ma} \times P)}$$

wherein

P=saponification number of the alkenyl or alkyl succinic anhydride sample (mg KOH/g)

A=actives fraction of the alkenyl or alkyl succinic anhydride sample

Mpo=number average molecular weight of the starting polyolefin Mma=98 (molecular weight of maleic anhydride)

C=conversion factor=112220 (for conversion of gram-moles of alkenyl or alkyl succinic anhydride per gram of sample to milligrams of KOH per gram of sample).

The actives fraction of the alkenyl or alkyl succinic anhydride may be determined from the percent of unreacted polyolefin according to the following procedure. A 5.0 gram sample of the reaction product of maleic anhydride and polyolefin is dissolved in hexane, placed in a column of 80.0 grams of silica gel (Davisil 62, a 140 angstrom pore size silica gel), and eluted with 1 liter of hexane. The percent unreacted polyolefin is determined by removing the hexane solvent under vacuum from the eluent and weighing the residue. Percent unreacted polyolefin is calculated according to the following formula:

$$\text{Percent Unreacted Polyolefin} = \frac{\text{Net Weight of Residue}}{\text{Sample Weight}} \times 100$$

The weight percent actives for the alkenyl or alkyl succinic anhydride product is calculated from the percent unreacted polyolefin using the formula:

Weight Percent Actives=100−Percent Unreacted Polyolefin

The actives fraction of the alkenyl or alkyl succinic anhydride is then calculated as follows:

$$\text{Actives Fraction} = \frac{\text{Weight Percent Actives}}{100}$$

The percent conversion of polyolefin is calculated from the weight percent actives as follows:

$$\text{Percent Conversion} = \frac{\text{wt. \% actives} \times \left(\frac{M_{po}}{M_{po} + [M_{ma} \times SR]}\right)}{\left[\text{wt. \% actives} \times \left(\frac{M_{po}}{M_{po} + [M_{ma} \times SR]}\right)\right] + [100 - \text{wt. \% actives}]}$$

wherein $M_{po}$=number of average molecular weight of the starting polyolefin $M_{ma}$=98(molecular weight of maleic anhydride)

SR=succinic ratio of alkenyl or alkyl succinic anhydride product

It is, of course, understood that alkenyl or alkyl succinic anhydride products having high succinic ratios can be blended with other alkenyl succinic anhydrides having lower succinic ratios, for example ratios of around 1.0, to provide an alkenyl succinic anhydride product having an intermediate succinic ratio.

In general, suitable succinic ratios for the alkenyl or alkyl succinic anhydride reactants employed in preparing the additives of this invention are greater than about 1 but less than about 2. Succinic anhydrides with succinic ratios of about 2, when reacted with amines having greater than 4 nitrogen atoms per mole and post-treated with a cyclic carbonate, form gels. Accordingly, succinic ratios of about 1.7 or less are preferred.

DETAILED DESCRIPTION OF THE INVENTION

A. The PIB/UAR Copolymer

One embodiment of this invention is a copolymer referred to herein as the PIB/UAR copolymer. The PIB/UAR copolymer may be prepared by reacting a low molecular weight PIB with an unsaturated acidic reagent in the presence of a free radical initiator.

Preferred PIB/UAR copolymers include those in which an unsaturated acidic reagent, most preferably maleic anhydride, is copolymerized with a low molecular weight PIB and wherein about 20% or more, preferably about 50% or more, and more preferred about 80% or more of the olefinic bonds of the PIB comprises alkylvinylidene.

More preferred PIB/UAR copolymers include those in which an unsaturated acidic reagent, most preferably maleic anhydride, is copolymerized with a low molecular weight PIB wherein about 20% or more, preferably about 50% or more, and more preferred about 80% or more of the olefinic bonds of the PIB comprises methylvinylidene.

PIB/UAR copolymers may comprise a mixture of low molecular weight PIB molecules of varying molecular weight because low molecular weight PIB used to prepare PIB/UAR copolymers are generally mixtures of individual molecules of different molecular weights. Also, the PIB/UAR copolymer may comprise PIB/UAR copolymer molecules having different degrees of polymerization.

The PIB/UAR copolymers have an average degree of polymerization of about 1.1 to about 20, and more preferably from about 1.5 to about 10. The PIB/UAR copolymers have a number average molecular weight of about 231 to about 10,920. Among other factors, the present invention is based on the surprising finding that the preparation of the PIB/UAR copolymer does not require the use of any chain transfer agents and the PIB/UAR copolymer is liquid at ambient temperatures. Thus, the PIB/UAR copolymers are prepared by reacting a low molecular weight PIB in which a high proportion of unsaturation, about 20% or more is in the alkylvinylidene configuration, with an unsaturated acidic reagent in the presence of a free radical initiator.

The succinic ratio of the PIB/UAR copolymer may be greater than 1 or less than 1. The PIB/UAR copolymer may be alternating or random. The PIB/UAR copolymers may have the general formula:

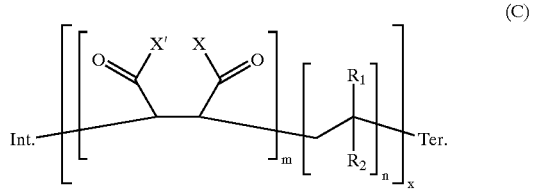
(C)

wherein:
X and X' comprise one or more of —OH; —O—hydrocarbyl; —NH2; —Cl; —Br; —OM+, wherein M+ comprises one equivalent of one or more metals, ammoniums or amine cations; and X and X' take together as —O— so as to form an anhydride;
n is a whole integer from 1 to 3;
$R_1$ comprises methyl;
$R_2$ comprises polyisobutyl having less than 32 carbon atoms, preferably about 5 to about 25 carbon atoms;
m comprises a whole integer of from 1 to 3;
x comprises a whole integer of from 1 to 20, preferably about 2 to about 10, more preferably 2 to 8;
Int. comprises one or more initiating radicals; and
Ter. comprises one or more terminating groups.

The Int. and Ter. substituents are a result of the free radical initiator used to prepare the PIB/UAR copolymer. Typical (Int.) and (Ter.) groups may include:

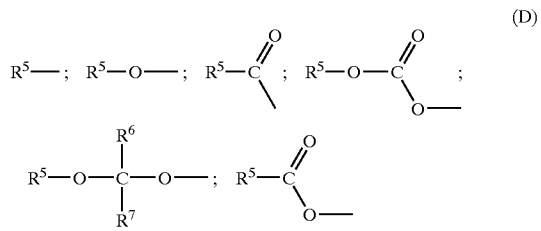
(D)

wherein $R^5$ is hydrogen, alkyl, aryl, alkaryl, cycloalkyl, alkoxy, cycloalkoxy, acyl, alkenyl, cycloalkenyl, alkynyl; or alkyl, aryl or alkaryl optionally substituted with 1 to 4 substituents independently selected from nitrile, keto, halogen, nitro, alkyl, aryl, and the like; and $R^6$ and $R^7$ are independently hydrogen, alkyl, aryl, alkaryl, and the like.

In a preferred embodiment, when maleic anhydride is used as the unsaturated acidic reagent, the reaction produces PIB/UAR copolymers predominately of the following formula:

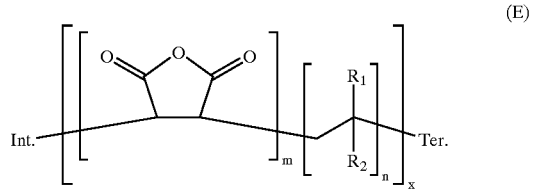
(E)

wherein $R_1$, $R_2$, n, m, x, Int. and Ter. are as defined in formula (C).

A(1) Low Molecular Weight Polyisobutene (PIB)

Preferred low molecular weight PIBs comprise less than about 32 carbon atoms, for example, one or more of 32 carbon atoms, 28 carbon atoms, 24 carbon atoms, 20 carbon atoms, 16 carbon atoms, 12 carbon atoms, and 8 carbon atoms. More preferred low molecular weight PIBs comprise from about 8 to about 28 carbon atoms. Most preferred low molecular weight PIBs comprise from about 12 to about 28 carbon atoms. Preferred low molecular weight PIBs have a molecular weight of about 448 or less. More preferred low molecular weight PIBs have a molecular weight of about 112 to about 392. Most preferred low molecular weight PIB has a molecular weight of about 168 to about 392.

The PIBs of this invention may be mixtures of individual low molecular weight PIB molecules of varying molecular weights. A mixture of low molecular weight PIBs might comprise any or all of $C_8$, $C_{12}$, $C_{16}$, $C_{20}$, $C_{24}$, $C_{28}$ and $C_{32}$ molecules. One embodiment of this invention may comprise the use of low molecular weight PIB molecules that have been separated according to carbon number. For example, a PIB mixture may be distilled to provide compositions that comprise one or more of $C_8$, $C_{12}$, $C_{16}$, $C_{20}$, $C_{24}$, $C_{28}$, or $C_{32}$ molecules. Preferred low molecular weight PIBs of this invention are those that are used as a mixture of varying molecular weights. A preferred low molecular weight PIB mixture may have the $M_n$ of about 150 to about 240.

A preferred low molecular weight PIB mixture may comprise the following: about 5 wt. % to about 20 wt. % $C_8H_{16}$, about 35 wt. % to about 55 wt. % $C_{12}H_{24}$, about 20 wt. % to about 30 wt. % $C_{16}H_{32}$, about 8 wt. % to about 15 wt. % $C_{20}H_{40}$, about 2 wt % to about 8 wt % $C_{24}H_{48}$, and about 0.5 wt % to about 2 wt % $C_{28}H_{56}$. $C_{32}H_{64}$ and higher species may comprise about 2 wt % or less of the total.

The olefinic bonds of a preferred low molecular weight PIB may comprise about 20% or more, preferably about 50% or more, and more preferred about 80% or more of the alkylvinylidene isomer.

The olefinic bonds of a more preferred low molecular weight PIB may comprise about 20% or more, preferably about 50% or more, and more preferred about 80% or more of the methylvinylidene isomer.

Preferred PIBs include those PIBs prepared using a boron triflouride (BF₃) catalyst. The preparation of PIBs in which the methylvinylidene isomer comprises a high percentage of the total composition is described in U.S. Pat. Nos. 4,152,499 and 4,605,808. Low molecular weight PIB may be prepared directly or they may be a distilled fraction of higher molecular weight polybutene.

A(2) Unsaturated Acidic Reagent

The term "unsaturated acidic reagent" refers to maleic or fumaric reagents of the general formula:

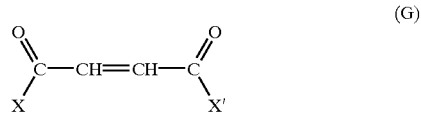
(G)

wherein X and X' are the same or different, provided that at least one of X and X' is a group that is capable of reacting to esterify alcohols, form amides, or amine salts with ammonia or amines, form metal salts with reactive metals or basically reacting metal compounds and otherwise function as acylating agents. Typically, X and X' comprise functional groups that may comprise one or more of —OH; —O—hydrocarbyl; —OM+ when M+ represents one equivalent of a metal, ammonium, or amine cation; —NH2; —Cl; —Br; or taken together X and X' may be —O— so as to form an anhydride. Preferably, X and X' are such that both carboxylic functions can enter into acylation reactions. Maleic anhydride is a preferred unsaturated acidic reagent.

Other suitable unsaturated acidic reagents include electron-deficient olefins such as monophenyl maleic anhydride; monomethyl, dimethyl, monochloro, monobromo, monofluoro, dichloro and difluoro maleic anhydride, N-phenyl maleimide and other substituted maleimides; iso-maleimides; fumaric acid, maleic acid, alkyl hydrogen maleates and fumarates, dialkyl fumarates and maleates, fumaronilic acids and maleanic acids; and maleonitrile, and fumaronitrile.

A(3) Free Radical Initiator

A free radical initiator is a molecular fragment having one or more unpaired electrons that are capable of initiating a polymerization reaction. Any free radical initiator may initiate the copolymerization described herein. Such initiators are well known in the art. However, the choice of free radical initiator may be influenced by the reaction temperature used.

The preferred free radical initiators are the peroxide-type polymerization initiators and the azo-type polymerization initiators. Radiation may also be used to initiate the reaction, if desired.

The peroxide-type free radical initiator may be organic or inorganic. Organic free radical initiators may have the general formula: ROOR' wherein R comprises any organic radical and R' comprises one or more of hydrogen and any organic radical. Both R and R' may be organic radicals, preferably hydrocarbon, aroyl, and acyl radicals, carrying, if desired, substituents such as halogens. Preferred peroxides include di-tert-butyl peroxide, tert-butyl peroxybenzoate, and dicumyl peroxide.

Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by alpha,alpha'-azobisisobutyronitrile, are also well-known free radical promoting materials. These azo compounds may be defined as those having present in the molecule group —N=N— wherein organic radicals satisfy the balance, at least one of which is preferably attached to a tertiary carbon. Other suitable azo compounds include, but are not limited to, p-bromobenzenediazonium fluoborate; p-tolyidiazoaminobenzene; p-bromobenzenediazonium hydroxide; azomethane and phenyidiazonium halides. A suitable list of azo-type compounds may be found in U.S. Pat. No. 2,551,813, issued May 8, 1951 to Paul Pinkney.

The amount of free radical initiator to employ, exclusive of radiation, depends to a large extent on the particular initiator selected, the low molecular PIB used and the reaction conditions. A preferred initiator is one that is soluble in the reaction medium. Preferred concentrations of initiator may be between about 0.001:1 and about 0.2:1 moles of initiator per mole of acidic reagent, with preferred amounts between bout 0.005:1 and about 0.10:1 moles.

It is preferred that the polymerization temperature is sufficiently high to break down the free radical initiator to produce the desired free radical s. The half-life values for known free radical initiators at various temperatures are readily available from the literature. See, for example, C. Walling, "Free Radicals in Solution", John Wiley and Sons, Inc., New York (1957). Alternatively, the half-life values are available from the various suppliers of free radical initiators. Table 1 lists the half-life temperatures for a number of free radical initiators at a given half-life. The half-life temperature is the temperature required for a free radical initiator to exhibit a specified half-life. As a rule, the higher the half-life temperature, the lower the half-life of the free radical initiator.

TABLE 1

HALF-LIFE TEMPERATURES OF VARIOUS FREE RADICAL INITIATORS AT SPECIFIED HALF-LIVES

| Free Radical Initiators | Half-Life (Temperature in degrees C.) | | | | |
|---|---|---|---|---|---|
| | 5 Min. | 10 Min. | 2 Hrs. | 5 Hrs. | 10 Hrs. |
| Dialkyl Peroxides: | | | | | |
| di-t-butyl peroxide | 173 | 166 | 143 | 135 | 129 |
| di-t-amyl peroxide | 167 | 160 | 137 | 129 | 123 |
| di-cumyl peroxide | 161 | 154 | 131 | 123 | 111 |
| 2,5-dimethyl-2, | 164 | 157 | 134 | 126 | 120 |
| 5-di(t-butylperoxy) | 134 | 128 | 106 | 99 | 93 |
| hexane Peroxyketals: | | | | | |
| 1,1-di-tannylperoxy- | | | | | |
| Cyclohexane | 85 | 79 | 60 | 54 | 49 |
| Diperoxycarbonates | | | | | |
| diethylhexylperoxy- | | | | | |
| Dicarbonate | 102 | 96 | 76 | 69 | 64 |
| Diacyl Peroxides: | | | | | |
| didecanoyl peroxide | | | | | |

In carrying out the process of the invention, a single free radical initiator or a mixture of free radical initiators may be employed. For example, it may be desirable to add an initiator having a low decomposition temperature as the mixture is warming to reaction temperature, and then add an initiator having a higher decomposition temperature as the mixture reaches higher reaction temperatures. Alternatively, a combination of initiators could both be added prior to heating and reaction. In this case, an initiator having a high decomposition temperature would initially be inert, but would later become active as the temperature rose.

The initiator may also be added over time. For example, if an initiator is chosen with a short half-life, e.g., 5–20 minutes, at the reaction temperature, then the initiator may be added over a period of time so that an adequate concentration of free radicals will be available throughout the reaction period to give improved yields of the desired product.

A(4) General Preparation of PIB/UAR Copolymer

The PIB/UAR copolymers may be prepared by reacting a low molecular weight PIB with an unsaturated acidic reagent in the presence of a free radical initiator.

The reaction may be conducted neat, that is, the low molecular weight PIB, the unsaturated acidic reagent and the free radical initiator are combined in the proper ratio, and then stirred at the reaction temperature.

The reaction time is usually sufficient to result in the substantially complete conversion of the reactive isomers of the low molecular weight PIB to the PIB/UAR copolymer. Suitable reaction times may be between one and 24 hours, with preferred reaction times between two and ten hours.

The low molecular weight PIB, unsaturated acidic reagent, and free radical initiator may be brought together in any suitable manner. No solvent is required. The important factors are intimate contact of the low molecular weight PIB and unsaturated acidic reagent in the presence of a free radical agent. The reaction, for example, may be conducted in a batch system in which the low molecular weight PIB is added all initially to a mixture of unsaturated acidic reagent and free radical initiator. The low molecular weight PIB may also be added intermittently or continuously to the other reactants. Alternatively, the reagents may be combined in other orders; for example, the unsaturated acidic reagent and free radical initiator may be added to low molecular weight PIB. The components in the reaction mixture may also be added continuously to a stirred reactor with continuous removal of a portion of the product to a recovery train or to other reactors in series. The reaction may also take place in a tubular reactor in which the components may be added at one or more points along the tube.

The reaction may be conducted at a temperature of about −30 degrees C. to about 210 degrees C., preferably from about 40 degrees C. to about 150 degrees C. As noted in the section regarding free radical initiators, it is preferred that the polymerization temperature is sufficiently high to decompose the free radical initiator to produce the desired free radicals. For example, using benzoyl peroxide as the initiator, the reaction temperature may be between about 75 degrees C. and about 90 degrees C., preferably between about 80 degrees C. and about 85 degrees C. The degree of polymerization is inversely proportional to the temperature. Thus, higher reaction temperatures are preferred for preparing PIB/UAR copolymers with a particularly low degree of polymerization. In general, after the reaction is deemed complete, for example, by NMR analysis, the reaction mixture is heated to decompose any residual initiator. For a di-tert-butyl peroxide initiator, this temperature is typically about 160 degrees C. or higher.

When the low molecular weight PIB, the unsaturated acidic reagent and the free radical initiator react to form PIB/UAR copolymer, the PIB/UAR. copolymer that is formed helps dissolve the unsaturated acidic reagent. This phenomenon facilitates the reaction of unreacted low molecular weight PIB, unsaturated acidic reagent and free radical initiator. In light of this phenomenon, previously formed PIB/UAR copolymer may be used to facilitate new reactions of low molecular weight PIB, unsaturated acidic reagent and free radical initiator reactants. Using the PIB/UAR copolymer to facilitate this reaction is referred to herein as the heel process.

A preferred method to use the PIB/UAR copolymer in the heel process is to combine the low molecular weight PIB, the unsaturated acidic reagent and PIB/UAR copolymer; heat this combination to reaction temperature; and then add the free radical initiator while maintaining a suitable reaction temperature. This process may be conducted in batch or in continuous mode.

The PIB/UAR copolymer for use the heel process may be obtained by retaining a portion of the PIB/UAR copolymer from a previous run. Preferred PIB/UAR copolymers for use in the heel process include the copolymer product of maleic anhydride and low molecular weight PIB. The preferred volume ratio of PIB/UAR copolymer to low molecular weight PIB in the heel process is between 1:1 and 1:100. A more preferred volume ratio of PIB/UAR copolymer to low molecular weight PIB in the heel process is between 1:1.5 and 1:4.

The heel process reaction may be conducted at a preferred temperature in the range of about 90 degrees C. to about 210 degrees C., and more preferably from about 130 degrees C. to about 150 degrees C. At lower reaction temperatures the reaction mixture may become too viscous and may require a solvent to obtain satisfactory reaction.

The heel process reaction may be used in a batch process or a continuous process. The reaction temperature range may be about 90 degrees C. to 210 degrees C. and preferably about 130 degrees C. to 150 degrees C. The unsaturated acidic reagent charge may theoretically range from 1 to 2 moles of unsaturated acidic reagent per mole of methyl vinylidene isomer of PIB. Typically, the free radical initiator may be charged at about 0.1 moles initiator per about 1.0 moles unsaturated acidic reagent, although this may vary. The reaction may be carried out at atmospheric pressure. At higher temperatures, it may be desirable to pressurize the reactor slightly (i.e., 10 psig) to suppress the loss of unsaturated acidic reagent to the vapor phase.

If a batch reaction is used, PIB/UAR copolymer from a previous run and low molecular weight PIB may be charged to the reactor. A sufficient ratio of low molecular weight PIB to PIB/UAR copolymer to assure complete solubility of unsaturated acidic reagent in the mixture at reaction conditions is preferred. If PIB/UAR copolymer is not added at a sufficient level so as to maintain total unsaturated acidic reagent solubility, the rate of reaction may be negatively affected, and the formation of resin may be likely. To maximize reactor productivity, the minimum amount of PIB/UAR copolymer that is optimal to maintain total solubility of the unsaturated acidic reagent charge should be used. The reactor may be stirred and heated to the desired reaction temperature, and the unsaturated acidic reagent and free radical initiator may be added at the appropriate time/times during this step. Reaction times will vary with temperature, concentration of reactants, and types of free radical initiators. When the reaction is complete, removal of any unreacted unsaturated acidic reagent may be accomplished by increasing the reactor temperature to about 150 degrees C. to about 250 degrees C., preferably about 180 degrees C. to about 200 degrees C., while applying sufficient vacuum. This procedure also tends to decompose any remaining free radical initiator.

If the reaction is run continuously, a continuous stirred tank reactor (CSTR) or series of such reactors may be used. PIB, unsaturated acidic reagent, and free radical initiator may be fed continuously at appropriate rates so as to maintain a certain level of conversion of the reactants to PIB/UAR copolymer. It is envisioned that the product stream from the reactor then is heated to a temperature in the range of about 150 degrees C. to about 250 degrees C. and preferably in the range from about 180 degrees C. to about 200 degrees C. to strip off any unreacted unsaturated acidic reagent and to decompose any remaining free radical initiator. Vacuum may also be used to facilitate removing any unreacted unsaturated acidic reagent. It is envisioned that a wiped film evaporator or similar types of equipment may be suitable for this type of operation.

In general, after the reaction is deemed complete, for example, by NMR analysis, the reaction mixture is heated to decompose any residual initiator. For a di-tert-butyl peroxide initiator, this temperature is typically about 160 degrees C.

Using diluent is not necessary to prepare the PIB/UAR copolymer but one may be used if desired. When diluent is employed, those diluents that are inert to the reactants and products formed are preferred.

Using a solvent is not necessary to prepare the PIB/UAR copolymer, but one may be used if desired. When a solvent is employed, solvents that are inert to the reactants and products formed are preferred. Suitable solvents may include acetone, tetrahydrofuran, chloroform, methylene chloride, dichloroethane, toluene, dioxane, chlorobenzene, xylenes, or the like. Solvents may be removed after their usefulness is no longer required. The PIB/UAR copolymer product may be conveniently separated from any solvent used and any unreacted acidic reagent by conventional procedures such as phase separation, solvent distillation, precipitation and the like. Though not required, dispersing agents and/or co-solvents may be used during the reaction if desired.

Using a chain transfer agent to prepare the PIB/UAR copolymer of this invention is not required. A chain transfer agent, however, may be used if desired. When a chain transfer agent is employed, chain transfer agents that are inert to the reactants and products formed are preferred.

B. Polysuccinimides

One embodiment of this invention is a polymer that may be referred to herein as a PIB/UAR copolymer succinimide. This polymer is a polysuccinimide and may be depicted as the general formula:

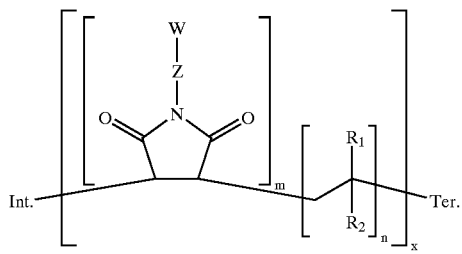
(H)

wherein:
W comprises one or more of:

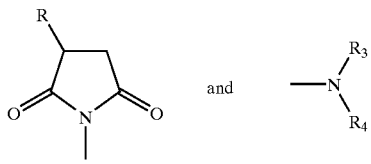
(I)

R comprises at least one of:
  one or more polyalkyls and one or more polyalkylenes, each of which have a number average molecular weight of at least about 1000, preferably from about 1800 to about 3,000;
$R_1$ comprises methyl;
$R_2$ comprises polyisobutyl having less than 32 carbon atoms, preferably about 5 to about 25 carbon atoms;
Z comprises one or more polyamine linking radicals;
m comprises a whole integer of from 1 to 3;
n comprises a whole integer of from 1 to 3;
x comprises a whole integer of from 1 to 20, preferably about 2 to about 10, more preferably 2 to 8;
Int. comprises one or more initiating radicals;
Ter. comprises one or more terminating groups; and
wherein $R_3$ and $R_4$ are independently hydrogen, alkyl, phenyl, or taken together are alkylene to give a ring group.

The compound of formula (H) may be considered a PIB/UAR copolymer succinimide and is produced by the reaction of a PIB/UAR copolymer with a monomer (the alkene or alkyl succinic acid derivative) in which the monomer is linked to the polymer units by a polyamine linking radical. Because the PIB/UAR copolymer succinimide mixture may contain about from 0.5 to 10 equivalents of alkenyl or alkylsuccinic acid derivative per equivalent of PIB/UAR copolymer, and about from 0.4 to 1.0 equivalents of polyamine per equivalent of alklenyl or alkylsuccinic acid derivative plus PIB/UAR copolymer, other structures, such as those presented in formulas (J) and (K) may also be present, depending on the ratios of alkenyl or alkylsuccinic acid derivative, PIB/UAR copolymer and polyamine.

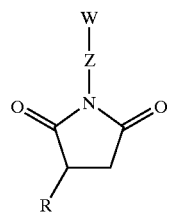
(J)

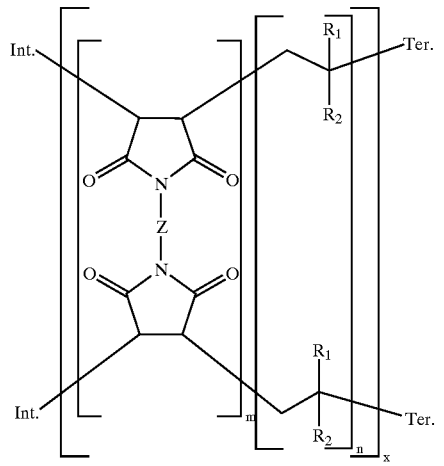
(K)

wherein W, R, $R_1$, and $R_2$, Z, m, n, x, Int., Ter are the same as described in formula (H). For example, if the ratio of alkenyl or alkyl succinic acid derivative per equivalent of unsaturated acidic reagent copolymer is 1.0:1, and the ratio of polyamine to the sum of the alkenyl or alkylsuccinic acid derivative plus unsaturated acidic reagent copolymer is 0.5:1, then structure (H) would predominate. However, if the ratio of alkenyl or alkylsuccinic acid derivative per equivalent of PIB/UAR copolymer is greater than 1:1, and the ratio of polyamine per equivalent of alkenyl or alkylsuccinic acid derivative plus unsaturated acidic reagent copolymer is 0.5:1, then structures (J) and (K) will predominate, when W is

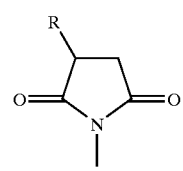
(L)

In addition, if the ratio of alkenyl or alkylsuccinic acid derivative per equivalent of PIB/UAR copolymer is greater than 1:1 and the ratio of polyamine to alkenyl or alkylsuccinic acid derivative plus PIB/UAR copolymer is about 1.0:1, then structures (H) and (K) would predominate, when W is $NH_2$.

In addition to the predominant polymer of formula (H), (J), or (K), the reaction will typically contain more complex reaction products and polymers because of competing and sequential reactions, and because the alkenyl or alkylsuccinic acid derivative might contain more than one succinic anhydride moiety per long chain alkyl or alkenyl group or contain unsaturated acidic reagent oligomers.

Referring to formulas (H), (J), or (K), the preferred compounds or compound mixtures are those wherein R is a PIB having an Mn of between 1800 and 3000; $R_1$ is a methyl, $R_2$ is a low molecular weight PIB; Z is a polyamino radical having about from 3 to 7, more preferably, about 4 to 5 nitrogen atoms and 8 to 20 carbon atoms; and x is a whole integer of from 2 through 20.

B(1) Synthesis of the Polysuccinimide

A succinimide composition comprising PIB/UAR copolymer succinimides may be prepared by contacting the desired alkyl or alkenyl succinic acid derivative with a PIB/UAR copolymer and polyamine under reactive conditions:

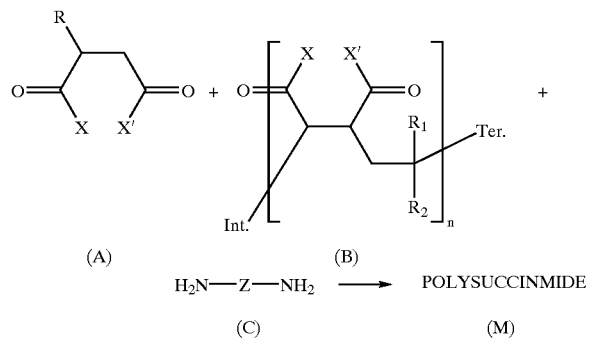

wherein R, $R_1$, $R_2$, Z, X, X', n, (Int) and (Ter) are as defined herein. This process is typically conducted by contacting from about 0.5 to about 10 equivalents of alkenyl or alkylsuccinic acid derivative (reactant A of reaction (M)) per mole of PIB/UAR copolymer (reactant B of reaction (M)) and from about 0.4 to about 1.0 equivalents of amine (reactant C of reaction (M)) per equivalent of alkenyl or alkylsuccinic acid derivative (reactant A of reaction (M)) plus PIB/UAR copolymer (reactant B of reaction (M)). A preferred method is to first add the alkenyl or alkylsuccinic acid derivative and the PIB/UAR copolymer together and then add the polyamine.

A more preferred method is to first mix the alkenyl or alkylsuccinic acid derivative and the PIB/UAR copolymer together using a ratio-controlled mixing system in which these two components are simultaneously charged into a mixing device, such as a static mixer, at the desired weight or mole ratio. In like manner, the alkenyl or alkylsuccinic acid derivative and the PIB/UAR copolymer mixture is then combined with the polyamine using a ratio-controlled mixing system in which these two components are simultaneously charged into a mixing device, such as a static mixer, at the desired weight or mole ratio.

Typically, the reaction is conducted at temperatures in the range of about from about 140 degrees C. to about 180 degrees C., preferably about 150 degrees C. to about 170 degrees C. for about from 1 to 10 hours, preferably 4 to 6 hours. Typically the reaction is conducted at about atmospheric pressure; however, higher or lower pressures can also be used depending on the reaction temperature desired and the boiling point of the reactants or solvent if a solvent is used.

As noted herein, the reaction will typically be a mixture because there are secondary products or byproducts and the reactants are mixtures. In theory, pure compounds could be obtained, for example by using pure compounds as reactants and then separating out the desired pure compounds from the reaction product. However, the expense of this would rarely be justified for commercial purposes and accordingly the commercial product will generally be a mixture in which formulas (H), (J), and (K) will be the predominant compounds.

Water, present in the system or generated by the reaction of the amine with the succinic or maleic anhydride moieties of (reactant A of reaction (M)) and (reactant B of reaction (M)) alkyl succinimide, is preferably removed from the reaction system during the course of the reaction via azeotroping, stripping with nitrogen or distillation. After reaction completion, the system may be stripped at elevated temperatures (typically 100 degrees C. to 250 degrees C.) and reduced pressures to remove any volatile components that may be present in the product.

(B)(1)(A) The Aklenyl or Alkylsuccinic Acid Derivatives

Alkyl and alkenylsuccinic acid derivatives having a calculated succinic ratio of from about 1:1 to about 2.5:1, and preferably from about 1:1 to about 1.5:1, may be used in the present process. More preferably, the alkyl or alkenyl succinic acid derivatives have a succination ratio of about from about 1.1 to about 1.4. Most preferably alkyl or alkenylsuccinic anhydrides are used. Accordingly, alkenyl succinic anhydride prepared by the thermal process is preferred, because the calculated succination ratio of material prepared by this process is typically 1.0 to 1.4, and because the product is essentially chlorine-free since chlorine is not used in the synthesis.

The polyalkylene succinic anhydride is the reaction product of a polyalkylene (preferably polyisobutene) with maleic anhydride. Conventional polyisobutene, or high methylvinylidene polyisobutene may be used in the preparation of such polyalkylene succinic anhydrides. Thermal, chlorination, free radical, acid catalyzed, or any other process may be used in this preparation. Examples of suitable polyalkylene succinic anhydrides are thermal PIBSA (polyisobutenyl succinic anhydride) described in U.S. Pat. No. 3,361,673; chlorination PIBSA described in U.S. Pat. No. 3,172,892; a mixture of thermal and chlorination PIBSA described in U.S. Pat. No. 3,912,764; high succinic ratio PIBSA described in U.S. Pat. No. 4,234,435; PolyPIBSA described in U.S. Pat. Nos. 5,112,507 and 5,175,225; high succinic ratio PolyPIBSA described in U.S. Pat. Nos. 5,565,528 and 5,616,668; free radical PIBSA described in U.S. Pat. Nos. 5,286,799, 5,319,030, and 5,625,004; PIBSA made from high methylvinylidene polybutene described in U.S. Pat. Nos. 4,152,499, 5,137,978, and 5,137,980; high succinic ratio PIBSA made from high methylvinylidene polybutene described in European Patent Application Publication No. EP 355 895; terpolymer PIBSA described in U.S. Pat. No. 5,792,729; sulfonic acid PIBSA described in U.S. Pat. No. 5,777,025 and European Patent Application Publication No. EP 542 380; and purified PIBSA described in U.S. Pat. No. 5,523,417 and European Patent Application Publication No. EP 602 863. The disclosures of each of these documents is incorporated herein by reference in their entirety.

In accordance with the invention, the alkenyl or alkyl succinic anhydride reactant is derived from a polyolefin having a Mn from 1000 to 5000 and a Mw/Mn ratio of 1:1 to 5:1. In a preferred embodiment, the alkenyl or alkyl group of the succinimide has an Mn value from 1800 to 3000. Most preferred are alkenyl or alkyl substituents having an Mn of from 2000 to 2500.

Suitable polyolefin polymers for reaction with maleic anhydride include polymers comprising a major amount of $C_2$ to $C_5$ monoolefin, e.g., ethylene, propylene, butylene, iso-butylene and pentene. The polymers may be homopolymers, such as polyisobutylene, as well as copolymers of two or more such olefins, such as copolymers of: ethylene and propylene, butylene, and isobutylene, etc. Other copolymers include those in which a minor amount of the copolymer monomers (e.g., 1 to 20 mole %), may be a $C_4$ to $C_8$ nonconjugated diolefin, e.g., a copolymer of isobutylene and butadiene or a copolymer of ethylene, propylene and 1,4-hexadiene, etc.

A particularly preferred class of olefin polymers for reaction with maleic anhydride comprises the polybutenes, which are prepared by polymerization of one or more of 1-butene, 2-butene and isobutene. Especially desirable are polybutenes containing a substantial proportion of units derived from isobutene. The polybuitene may contain minor amounts of butadiene, which may or may not be incorporated in the polymer. These polybutenes are readily available commercial materials well known to those skilled in the art. Examples of procedures illustrating the preparation of such material may be found, for example, in U.S. Pat. Nos. 3,215,707; 3,231,587; 3,515,669; 3,579,450; 3,912,764 and 4,605,808, hereby incorporated by reference for their disclosures of suitable polybutenes.

The alkenyl or alkylsuccinic anhydride may also be prepared using the so-called highly reactive or high methyl vinylidene polyalkylene, most commonly PIB, such as described in U.S. Pat. Nos. 4,152,499; 5,071,919; 5,137,980; 5,286,823; 5,254,649; 5,688,887; published International Applications Numbers; WO 9310063-A1; and published European Patent Applications Numbers 0355895-A; sand 0587381A, all of which are hereby incorporated by reference in their entirety. Other polyalkenes may also be used including, for example, polyalkenes prepared using metallocene catalysts.

(B)(1)(B) The PIB/UAR Copolymer

The PIB/UAR Copolymer of this synthesis reaction is the PIB/UAR Copolymer of this invention and is previously described herein.

(B)(1)(C) The Polyamine Reactant

The polyamine reactant should have at least three amine nitrogen atoms per mole, and preferably 4 to 12 amine nitrogens per molecule. Most preferred are polyamines having from about 6 to about 10 nitrogen atoms per molecule. The number of amine nitrogen atoms per molecule of polyamine is calculated as follows:

$$\text{Average number of nitrogen atoms in molecule of polyamine} = \frac{\% N \times M_{pa}}{14 \times 100}$$

wherein % N=percent nitrogen in polyamine or polyamine mixture $M_{pa}$=number average molecular weight of the polyamine or polyamine mixture Preferred polyalkylene polyamines comprise from about 4 to about 20 carbon atoms, there being preferably from 2 to 3 carbon atoms per alkylene unit. The polyamine preferably has a carbon-to-nitrogen ratio of from about 1:1 to 10:1. Examples of suitable polyamines that may be used to form the compounds of this invention include the following: TEPA, pentaethylene hexamine, Dow E-100® heavy polyamine (number=303, available from Dow Chemical Company, Midland, Mich.), and Union Carbide HPA-X heavy polyamine (number average molecular weight=275, available from Union Carbide Corporation, Danbury, Conn.). Such amines encompass isomers, such as branched-chain polyamines, and the previously mentioned substituted polyamines, including hydrocarbyl-substituted polyamines. HPA-X heavy polyamine ("HPA-X") contains an average of approximately 6.5 amine nitrogen atoms per molecule. Such heavy polyamines generally afford excellent results.

The polyamine reactant may be a single compound but typically will be a mixture of compounds reflecting commercial polyamines. The commercial polyamine will typically be a mixture in which one or several compounds predominate with the average composition indicated. For example, TEPA prepared by the polymerization of aziridine or the reaction of dichloroethylene and ammonia will have both lower and higher amine members, e.g., TETA, substituted piperazines and pentaethylene hexamine, but the composition will be largely TEPA and the empirical formula of the total amine composition will closely approximate that of TEPA.

Other examples of suitable polyamines include admixtures of amines of various sizes, provided that the overall mixture contains at least 4 nitrogen atoms per molecule. Included within these suitable polyamines are mixtures of diethylene triamine ("DETA") and heavy polyamine. A preferred polyamine admixture reactant is a mixture containing 20% by weight DETA and 80% by weight HPA-X; as determined by the method described herein, this preferred polyamine reactant contains an average of about 5.2 nitrogen atoms per mole.

Methods of preparing polyamines and their reactions are detailed in Sidgewick's THE ORGANIC CHEMISTRY OF NITROGEN, Clarendon Press, Oxford, 1966; Noller's CHEMISTRY OF ORGANIC COMPOUNDS, Saunders, Philadelphia, 2nd Ed., 1957; and Kirk-Othmer's ENCYCLOPEDIA OF CHEMICAL TECHNOLOGY, 2nd Ed., especially Volumes 2, pp. 99–116.

C. Post-treatments

The polysuccinimide prepared using the PIB/UAR copolymer may be post-treated with a wide variety of post-treating reagents. U.S. Pat. No. 4,234,435, the disclosure of which is incorporated herein by reference, discloses reacting succinic acylating agents with a variety of reagents to give post-treated carboxylic acid derivative compositions that are useful as polysuccinimides and detergents in lubricating oil compositions.

For example, the dispersancy of the polysuccinimide prepared using the PIB/UAR copolymer may be improved by reaction with a cyclic carbonate. This may result in some reduction in fluorocarbon elastomer compatibility. However, this may generally be more than offset by reducing the concentration of the carbonated post-treated polymer in light of the increased dispersancy. The resulting modified polymer has one or more nitrogens of the polyamino moiety substituted with a hydroxy hydrocarbyl oxycarbonyl, a hydroxy poly(oxyalkylene) oxycarbonyl, a hydroxyalkylene, hydroxyalkylenepoly(oxyalkylene), or mixture thereof.

The cyclic carbonate post-treatment may be conducted under conditions sufficient to cause reaction of the cyclic carbonate with secondary amino group of the polyamino substituents. Typically, the reaction is conducted at temperatures of about from about 0 degree C. to about 250 degrees C., preferably from about 100 degrees C. to about 200 degrees C. and most preferred from about 50 degrees C. to about 180 degrees C.

The reaction may be conducted neat, wherein both the polymer and the cyclic carbonate are combined in the proper ratio, either alone or in the presence of a catalyst (such as an acidic, basic or Lewis acid catalyst). Examples of suitable catalysts include, for example, phosphoric acid, boron trifluoride, alkyl or aryl sulfonic acid, alkali or alkaline carbonate. The same solvents or diluents as described herein with respect to the preparing the PIB/UAR copolymer may also be used in the cyclic carbonate post-treatment.

The reaction of polyamino alkenyl or alkyl succinimides with cyclic carbonates is known in the art and is described in U.S. Pat. No. 4,612,132, hereby incorporated by reference, in its entirety. Generally, the procedures described to post-treat polyamino alkenyl or alkyl succinimides with cyclic carbonates may also be applied to post treat the PIB/UAR copolymer.

A particularly preferred cyclic carbonate may be 1,3-dioxolan-2-one (ethylene carbonate).

The molar charge of cyclic carbonate employed in the post-treatment reaction is preferably based upon the theoretical number of basic nitrogens contained in the polyamino substituent of the succinimide. Thus, when one equivalent of tetraethylene pentamine (TEPA) is reacted with one equivalent of succinic anhydride and one equivalent of the PIB/UAR copolymer, the resulting bis succinimide will theoretically contain 3 basic nitrogens. Accordingly, a molar charge of 2 would require that two moles of cyclic carbonate be added for each basic nitrogen or in this case 6 moles of cyclic carbonate for each mole equivalent of polyalkylene succinimide or succinimide prepared from TEPA. Mole ratios of the cyclic carbonate to the basic amine nitrogen of the polyamino alkenyl succinimide used in the process of this invention are typically in the range of from about 1:1 to about 4:1; although preferably from about 2:1 to about 3:1.

As described in U.S. Pat. No. 4,612,132, cyclic carbonates may react with the primary and secondary amines of a polyamino alkenyl or alkyl succinimide to form two types of compounds. First, strong bases including unhindered amines such as primary amines and some secondary amines, react with an equivalent of cyclic carbonate to produce a carbamic ester. Second, hindered bases such as hindered secondary amines, may react with an equivalent of the same cyclic carbonate to form a hydroxyalkyleneamine linkage. (Unlike the carbamate products, the hydroxyalkyleneamine products retain their basicity.) Accordingly, the reaction of a cyclic carbonate may yield a mixture of products. When the molar charge of the cyclic carbonate to the basic nitrogen of the succinimide is about 1 or less, a large portion of the primary and secondary amines of the succinimide will be converted to hydroxy hydrocarbyl carbamic esters with some hydroxyhydrocarbylamine derivatives also being formed. As the mole ratio is raised above about 1 increased amounts of poly(oxyalkylene) polymers of the carbamic esters and the hydroxyhydrocarbylamine-derivatives may be produced.

The polysuccinimide prepared using the PIB/UAR copolymer and the post-treated polysuccinimide prepared using the PIB/UAR copolymer may also be reacted with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to succinimide may be used.

In addition to the carbonate and boric acid post-treatments, the compounds may be post-treated, or further post-treatment, with a variety of post-treatments designed to improve or impart different properties. Such post-treatments include those summarized in columns 27–29 of U.S. Pat. No. 5,241,003, hereby incorporated by reference. Such treatments may include treatment with:

Inorganic phosphorous acids or anhydrates (e.g., U.S. Pat. Nos. 3,403,102 and 4,648,980);

Organic phosphorous compounds (e.g., U.S. Pat. No. 3,502,677);

Phosphorous pentasulfides;

Boron compounds as already noted herein (e.g., U.S. Pat. Nos. 3,178,663 and 4,652,387);

Carboxylic acid, polycarboxylic acids, anhydrides and/or acid halides (e.g., U.S. Pat. Nos. 3,708,522 and 4,948,386);

Epoxides polyepoxiates or thioexpoxides (e.g., U.S. Pat. Nos. 3,859,318 and 5,026,495);

Aldehyde or ketone (e.g., U.S. Pat. No. 3,458,530);

Carbon disulfide (e.g., U.S. Pat. No. 3,256,185);

Glycidol (e.g., U.S. Pat. No. 4,617,137);

Urea, thourea or guanidine (e.g., U.S. Pat. Nos. 3,312,619; 3,865,813; and British Patent GB 1,065,595);

Organic sulfonic acid (e.g., U.S. Pat. No. 3,189,544 and British Patent GB 2,140,811);

Alkenyl cyanide (e.g., U.S. Pat. Nos. 3,278,550 and 3,366,569);

Diketene (e.g., U.S. Pat. No. 3,546,243);

A diisocyanate (e.g., U.S. Pat. No. 3,573,205);

Alkane sultone (e.g., U.S. Pat. No. 3,749,695);

1,3-Dicarbonyl Compound (e.g., U.S. Pat. No. 4,579,675);

Sulfate of alkoxylated alcohol or phenol (e.g., U.S. Pat. No. 3,954,639);

Cyclic lactone (e.g., U.S. Pat. Nos. 4,617,138; 4,645,515; 4,668,246; 4,963,275; and 4,971,711);

Cyclic carbonate or thiocarbonate linear monocarbonate or polycarbonate, or chloroformate (e.g., U.S. Pat. Nos. 4,612,132; 4,647,390; 4,648,886; 4,670,170);

Nitrogen-containing carboxylic acid (e.g., U.S. Pat. 4,971,598 and British Patent GB 2,140,811);

Hydroxy-protected chlorodicarbonyloxy compound (e.g., U.S. Pat. No. 4,614,522);

Lactam, thiolactam, thiolactone or ditholactone (e.g., U.S. Pat. Nos. 4,614,603 and 4,666,460);

Cyclic carbonate or thiocarbonate, linear monocarbonate or plycarbonate, or chloroformate (e.g., U.S. Pat. Nos. 4,612,132; 4,647,390; 4,646,860; and 4,670,170);

Nitrogen-containing carboxylic acid (e.g., U.S. Pat. No. 4,971,598 and British Patent GB 2,440,811);

Hydroxy-protected chlorodicarbonyloxy compound (e.g., U.S. Pat. No. 4,614,522);

Lactam, thiolactam, thiolactone or dithiolactone (e.g., U.S. Pat. Nos. 4,614,603, and 4,666,460);

Cyclic carbamate, cyclic thiocarbamate or cyclic dithiocarbamate (e.g., U.S. Pat. Nos. 4,663,062 and 4,666,459);

Hydroxyaliphatic carboxylic acid (e.g., U.S. Pat. Nos. 4,482,464; 4,521,318; 4,713,189);

Oxidizing agent (e.g., U.S. Pat. No. 4,379,064);

Combination of phosphorus pentasulfide and a polyalkylene polyamine (e.g., U.S. Pat. No. 3,185,647);

Combination of carboxylic acid or an aldehyde or ketone and sulfur or sulfur chloride (e.g., U.S. Pat. Nos. 3,390,086; 3,470,098);

Combination of a hydrazine and carbon disulfide (e.g. U.S. Pat. No. 3,519,564);

Combination of an aldehyde and a phenol (e.g., U.S. Pat. Nos. 3,649,229; 5,030,249; 5,039,307);

Combination of an aldehyde and an O-diester of dithiophosphoric acid (e.g., U.S. Pat. No. 3,865,740);

Combination of a hydroxyaliphatic carboxylic acid and a boric acid (e.g., U.S. Pat. No. 4,554,086);

Combination of a hydroxyaliphatic carboxylic acid, then formaldehyde and a phenol (e.g., U.S. Pat. No. 4,636,322);

Combination of a hydroxyaliphatic carboxylic acid and then an aliphatic dicarboxylic acid (e.g., U.S. Pat. No. 4,663,064);

Combination of formaldehyde and a phenol and then glycolic acid (e.g., U.S. Pat. No. 4,699,724);

Combination of a hydroxyaliphatic carboxylic acid or oxalic acid and then a diisocyanate (e.g. U.S. Pat. No. 4,713,191);

Combination of inorganic acid or anhydride of phosphorus or a partial or total sulfur analog thereof and a boron compound (e.g., U.S. Pat. No. 4,857,214);

Combination of an organic diacid then an unsaturated fatty acid and then a nitrosoaromatic amine optionally followed by a boron compound and then a glycolating agent (e.g., U.S. Pat. No. 4,973,412);

Combination of an aldehyde and a triazole (e.g., U.S. Pat. No. 4,963,278);

Combination of an aldehyde and a triazole then a boron compound (e.g., U.S. Pat. No. 4,981,492);

Combination of cyclic lactone and a boron compound (e.g., U.S. Pat. No. 4,963,275 and 4,971,711).

D. Lubricating Oil Compositions

The PIB/UAR copolymer, polysuccinimides made using the PIB/UAR copolymer and post-treated polysuccinimides made using the PIB/UAR copolymer all of which are described herein are useful as detergent and dispersant additives when used in lubricating oils. When used as detergents or dispersants, these additives may be used at about 0.2 to about 10 wt. % of the total lubricating oil composition and preferably at about 0.5 wt. % to about 8% wt. % and more preferably at about 1 wt. % to about 6 wt. % of the total lubricating oil composition.

The lubricating oil used with these additive compositions may be mineral oil or synthetic oils of lubricating viscosity and preferably suitable for use in the crankcase of an internal combustion engine. Crankcase lubricating oils ordinarily have a viscosity of about 1300 cSt at 0 degrees F. to 22.7 cSt at 210 degrees F. (99 degrees C.). The lubricating oils may be derived from synthetic or natural sources. Hydrocarbon synthetic oils may include, for example, oils prepared from the polymerization of ethylene, i.e., polyalphaolefin or PAO, or from hydrocarbon synthesis procedures using carbon monoxide and hydrogen gases such as in a Fisher-Tropsch process. Mineral oil for use as the base oil in this invention may include paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. The hydrogenated liquid oligomers of $C_6$ to $C_{12}$ alpha olefins such as 1-decene trimer are especially useful. Alkyl benzenes of proper viscosity, such as didodecyl benzene may also be used.

Hydrocarbon oils blended with synthetic oils may also be useful. For example, blends of 10 to 25 wt. % hydrogenated 1-decene trimer with 75 to 90 wt. % 150 SUS (100 degrees F.) mineral oil are preferred as a lubricating oil base.

Lubricating oil concentrates are also envisioned. These concentrates usually include from about 90 wt. % to about 10 wt. %, preferably from about 90 wt. % to about 50 wt. %, of an oil of lubricating viscosity and from about 10 wt. % to about 90 wt. %, preferably from about 10 wt. % to about 50 wt. %, of the additives described herein. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils that may be used as diluents typically have viscosity in the range from about 35 to about 500 Saybolt Universal Seconds (SUS) at 100 degrees F. (38 degrees C.), although any oil of lubricating viscosity may be used.

Other additives that may be used include rust inhibitors, foam inhibitors, corrosion inhibitors, metal deactivators, pour point depressants, antioxidants, and a variety of other well-known additives.

It is also contemplated that the additives described herein may be employed as dispersants and detergents in hydraulic fluids, marine crankcase lubricants and the like. When so employed, the additive is added at from about 0.1 to 10% by weight to the oil. Preferably, at from 0.5 to 8 wt. %.

E. Fuel Compositions

The proper concentration of the additive described herein that are necessary to achieve the desired detergency in fuel compositions is dependent upon a variety of factors including the type of fuel used, the presence of other detergents or dispersants or other additives, etc. Generally, however, the range of additive concentration in the base fuel is 10 to 10,000 weight parts per million, preferably from 30 to 5000 parts per million of the additive per part of base fuel. If other detergents are present, a lesser amount of the additive may be used. The additives described herein may be formulated as a fuel concentrate, using an inert stable oleophilic organic solvent boiling in the range of about 150 degrees F. to about 400 degrees F. An aliphatic or an aromatic hydrocarbon solvent is preferred. Preferred solvents include benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the amount of the additive will be ordinarily be about 5 or more wt. % and generally not exceed about 70 wt. %, preferably from about 5 wt. % to about 50 wt. % and more preferably from about 10 wt. % to about 25wt. %.

F. Surface Sizing Agents

It is also contemplated that the PIB/UAR copolymers described herein may be used as is or as an intermediate for surface sizing agents for paper products.

G. Pour Point Depressants

It is also contemplated that the PIB/UAR copolymers described herein may be used as is or as an intermediate for pour point depressants.

The following examples are included to demonstrate preferred embodiments of the invention. It should be appreciated by those of skill in the art that the techniques disclosed in the examples that follow may represent techniques discovered by the inventor to function well in the practice of the invention, and thus may be considered to constitute preferred modes for its practice. However, those of skill in the art should, in light of the present disclosure, appreciate that many changes may be made in the specific embodiments that are disclosed and still obtain a like or similar result without departing from the spirit and scope of the invention.

EXAMPLE 1

$C_8$–$C_{28}$ PIB/UAR Copolymer

Prepared In an Aromatic Solvent

Low molecular weight PIB,128.01 g (0.57 mol) was added to 157.39g of $C_9$ aromatic solvent in a 1 L three neck flask equipped with a Dean Stark trap, a heating mantle, and a mechanical stirrer. The low molecular weight PIB comprised a mixture of about 47% hexane solvent plus $C_8$ isomer and about 53% $C_{12}$–$C_{28}$ isomers. This mixture was stirred and heated at 130 degrees C. to distill out the hexane and the $C_8$ isomers and to azeotrope out any water. To this mixture, 50.31 g of maleic anhydride (0.51 mol) was added. To the resulting mixture, a total of 1.7 g di-t-butyl peroxide (0.012 mol) was added in five portions over a two-hour period. Then the temperature was increased to 150 degrees C. and held there for 3 hours. The aromatic solvent and any unreacted low molecular weight PIB were then removed by distillation at 190 degrees C. under vacuum. A total of 40.96 g of product was obtained. This product had a SAP number of 290 mg KOH/g sample. The $M_n$ as determined by GPC was 930 and the $M_w$ was 1851.

EXAMPLE 2

Predistilled $C_{12}$–$C_{28}$ PIB/UAR

Copolymer Prepared In an Aromatic Solvent

In this example, low molecular weight PIB were first distilled to remove any hexane diluent and any $C_8$ isomers. After distillation, the low molecular weight PIB comprised about 36.2% $C_{12}$, about 41.4% $C_{16}$, about 16% $C_{20}$, about 5% $C_{24}$, and about 1.3% $C_{28}$ isomers. A mixture was prepared by adding 427.3 g of $C_9$ aromatic solvent to 520.4 g of the distilled low molecular weight PIB (2.48 mol) in a 3 L four-neck flask equipped with a heating mantle, magnetic stirrer and a Dean Stark trap. This mixture was heated at 134 degrees C. to remove water. Then, to this mixture, 206.8 g maleic anhydride (2.11 mol), and 6.5 ml di-t-butylperoxide was added in five portions over 3 hours. The resulting mixture was then heated at 150 degrees C. overnight. The solvent was then removed in a vacuum to give a product that had a SAP number of 210 mg KOH/g sample. The $M_n$ of this product was 1642, and the $M_w$ was 2250 as determined by GPC.

EXAMPLE 3

$C_{14}$ Alpha Olefin/Ma Copolymer

Prepared In an Aromatic Solvent

A mixture was prepared by adding 60.45 g $C_9$ aromatic solvent to 49.31 g tetradecene-1 (0.251 mol). After adding 22.17 g maleic anhydride (0.226 mol) to this mixture, the resulting mixture was heated to 130 degrees C. overnight to remove any water. Then a mixture of 22.17 g maleic anhydride (0.226 mol) and 0.54 g di-tert-butyl peroxide (3.7 mmol) was added in three equal portions over 1 hour to the dehydrated solvent/tetradecene-1/maleic anhydride mixture. The resulting mixture was heated overnight at 135 degrees C. Then the solvent was removed in a vacuum. A total of 67.09 g product was obtained. The SAP number for this product was 288 mg KOH/g sample. The $M_n$ for this sample was 4188 and the $M_w$ was 7334.

EXAMPLE 4

$C_{14}$ Alpha Olefin/MA

Copolymer Prepared Without Solvent

A mixture was prepared by adding 74.51 g maleic anhydride (0.760 mol) to 300.91 g tetradecene-1 (1.532 mol). This mixture was heated to 131 degrees C., and 1.1 g di-tert-butyl peroxide (75 mmol) was added in 5 equal portions over three hours. Then the temperature was raised to 150 degrees C., and the reaction was continued overnight. The product of this reaction was then stripped in a vacuum to remove any unreacted tetradecene-1. This product had a SAP number of 199 mg KOH/g sample, had a $M_n$ of 14010, and a $M_w$ of 33900.

Examples 5–8 show that low molecular weight PIB/UAR copolymer may be prepared using the $C_{12}$–$C_{28}$ PIB without any aromatic solvent. A heel process, as described herein was used.

EXAMPLE 5

$C_{12}$–$C_{28}$ PIB/UAR Copolymer Prepared

Using a Heel Process and No Additional Solvent

A mixture was prepared by adding 30.02 g of $C_{12}$–$C_{28}$ PIB (0.143 mol) to 30.02 g of $C_{12}$–$C_{28}$ PIB/UAR copolymer that was prepared as described in Example 2. While stirring this mixture, 12.61 g maleic anhydride (0.129 mol) was added. Then, five equal portions of 0.212 g of di-tert-butyl peroxide (1.45 mmol) were added to the PIB/PIB/UAR copolymer; maleic anhydride mixture over 2.5 hours. The temperature was then increased to 150 degrees C. and held there overnight. This process resulted in a product that had $M_n$ Of 1487, a $M_w$ of 2452, and had a SAP number of 254 mg KOH/g sample.

EXAMPLE 6

Additional $C_{12}$–$C_{24}$ PIB/UAR

Copolymer Prepared Using the Heel Process

A mixture was prepared by adding 38.33 g of $C_{12}$–$C_{28}$ PIB (0.183 mol) to 38.37 g of PIB/UAR copolymer prepared as directed in Example 5. This mixture was heated to 100 degrees C. While stirring the mixture, 16.10 g maleic anhydride (0.164 mol) was added. Over three hours, 0.265 g di-tert-butyl peroxide was added in five equal portions. The temperature was then increased to 150 degree C. and held there overnight. The product from this reaction had a SAP number of 250 mg KOH/g sample, a $M_n$ of 1471, and a $M_w$ of 2502.

EXAMPLE 7

Additional $C_{12}$–$C_{24}$ PIB/UAR

Copolymer Prepared Using the Heel Process

Example 6 was repeated using 63.44 g of the PIB/UAR copolymer from Example 6, 63.63 g $C_{12}$–$C_{28}$ PIB (0.309 mol), and 27.26 g maleic anhydride (0.278 mol). Di-tert-butyl peroxide 0.45 g (3 mmol) was added as in described in Example 6. The product from this reaction had a SAP number of 262.5, a $M_n$ of 1578, and a $M_w$ of 2691.

TABLE 2

Table 2 includes chemical and physical properties for low molecular weight PIB/UAR copolymers prepared with and without solvent, low molecular weight PIB/UAR copolymers prepared using the heel process, and alpha olefin copolymers prepared with and without solvent. The results of Examples 1, 2, 3, 4, 5, 6 and 7 are presented in Table 2 and show that even with a solvent, using $C_{14}$ alpha olefin to prepare a copolymer produced a copolymer that was higher in molecular weight than the PIB/UAR copolymer that was prepared using the $C_{12}$–$C_{28}$ PIB with or without solvent when the heel process is used. Note that PIB/UAR copolymers are liquid at ambient temperature, whereas apha olefin copolymers are solid at ambient temperature.

| Example | Starting material | Physical Properties of Copolymer | Presence of Solvent or Heel Process | $M_n$ by GPC | $M_w$ by GPC | SAP No. Mg KOH/g sample |
|---|---|---|---|---|---|---|
| 1 | Low Molecular Weight PIB | Liquid | solvent | 930 | 1851 | 290 |
| 2 | Low Molecular Weight PIB | Liquid | solvent | 1642 | 2250 | 210 |
| 3 | Alpha olefin | Solid | solvent | 4188 | 7334 | 288 |
| 4 | Alpha olefin | Solid | Without solvent | 14010 | 33900 | 199 |
| 5 | Low Molecular Weight PIB | Liquid | Heel Process Without Solvent | 1487 | 2452 | 254 |
| 6 | Low Molecular Weight PIB | Liquid | Heel Process Without Solvent | 1471 | 2502 | 250 |
| 7 | Low Molecular Weight PIB | Liquid | Heel Process Without Solvent | 1578 | 2691 | 262.5 |

EXAMPLE 8

A Polysuccinimide Prepared Using the $C_{12}$–$C_{28}$ PIB/UAR Copolymer

A mixture was prepared by adding 229.06 g PIBSA 2300 (SAP number 50.4 mg KOH/g sample, 0.103 mole), 226.79 g diluent oil, and 17.10 g of the $C_{12}$–$C_{28}$ PIB/UAR copolymer from Example 1 (SAP number 290 mg KOH/g sample, 0.0442 mole) to a three neck flask equipped with a mechanical stirrer, nitrogen inlet, Dean Stark trap, and heating mantle. The PIBSA to PIB/UAR copolymer ratio was 70/30 on an anhydride basis. This means that there were 70 moles of PIBSA anhydride to 30 moles of PIB/UAR anhydride. After this mixture was heated to 100 degrees C., 21.21 g HPA (0.0771 mole) was added while stirring for 1 hour. The amine/anhydride CMR was 0.525. This mixture was heated to 165° C. for 72 hours. A polysuccinimide was formed that had 1.45% N, 31.0 TBN, 0.24 TAN, haze of 2.8%, and a viscosity at 100 degrees C. of 153 cSt.

EXAMPLE 9 and 10

Other Polysuccinimides Were Prepared

The procedure for Example 8 was repeated except that different amines and different amine/anhydride CMR was used. The chemical and physical properties for these products are shown in Table 3.

TABLE 3

Table 3 includes chemical and physical properties for polysuccinimides made with a 70 to 30 ratio of PIBSA to PIB/UAR copolymer on an anhydride basis and $C_{12}$–$C_{28}$ PIB/UAR copolymer. The results from Examples 8–10 show that a polysuccinimide may be prepared using the $C_{12}$–$C_{28}$ PIB/UAR copolymer prepared as directed in these examples.

| Example | Amine | Amine/PIBSA CMR | % N | TBN | Vis @ 100° C. | TAN | haze |
|---|---|---|---|---|---|---|---|
| 8 | HPA | 0.525 | 1.45 | 31.0 | 153 | 0.24 | 2.8 |
| 9 | TETA | 0.5 | 0.82 | 11.3 | 160 | 0.97 | 0.8 |
| 10 | HPA | 0.5 | 1.35 | 28.1 | 165 | 0.67 | 1.2 |

EXAMPLE 11

Polysuccinimide Post Treatment Using Ethylene Carbonate

A mixture was prepared by adding 23.62 g (0.27 mole) of ethylene carbonate to 185.65 g of a polysuccinimide prepared as described in Example 8. This mixture was prepared in a three-neck flask equipped with a mechanical stirrer, a heating mantle and a nitrogen inlet at 165 degrees C. while the mixture was being stirred. The EC/BN CMR was 2.0. This mixture was heated for 14 hours. The product had 1.37% N, 17.6 TBN, 0.20 TAN, haze of 11.0%, and a viscosity at degrees C. of 426 cSt.

EXAMPLE 12–13

Preparation of Other Post-Treated Polysuccinimides

Polysuccinimides of Examples 8, 9, and 10 were post treated as directed in Example 11.

TABLE 4

The chemical and physical properties of the post-treated polysuccinimides of Examples 11–13 are shown in Table 4.

| Post-treated Poly-succinimides | Poly-succinimide from Example | % N | TBN | Viscosity @ 100° C. | TAN | Haze |
|---|---|---|---|---|---|---|
| 11 | 8 | 1.37 | 17.6 | 426 | 0.2 | 11.0 |
| 12 | 9 | 0.81 | 7.5 | 182 | <0.05 | 5.7 |
| 13 | 10 | 1.29 | 16.3 | 372 | 0.06 | 6.1 |

EXAMPLE 14

Polysuccinimide Prepared Using $C_{12}$–$C_{28}$ PIB/UAR Copolymer

A mixture was prepared by adding 49.9 g PIB/UAR copolymer prepared according to example 1 (SAP 290 mg KOH/g sample 0.129 mole) to 1125 g of a mixture of sulfonic acid catalyzed PIBSA 2300 and diluent oil (SAP number 30 mg KOH/g sample, 0.30 mole) and 375 g of additional diluent oil in a three neck flask equipped with an overhead stirrer, heating mantle, and Dean Stark trap. The PIBSA to PIB/UAR copolymer ratio was 70/30 on an anhydride basis. This mixture was heated to 100 degrees C., and 59.08 g HPA (0.215 mole) was added. The amine/anhydride CMR was 0.5. This mixture was heated for 6 hours at 170 degrees C. and then cooled to 100 degrees C. A total of 7.2 ml water was collected over the 6-hour period. The product from this reaction was then reacted with 180.87 g of ethylene carbonate (2.06 mole) that was added over 1.5 hours. This product/ethylene carbonate mixture was heated to 170° C. for 14 hours. The product from this reaction had 1.22% N, TBN 15.7, TAN 1.05, viscosity at 100 degrees C. 254 cSt, and a haze of 11.9%.

EXAMPLE 15

Polysuccinimide Prepared Using $C_{12}$–$C_{28}$ PIB/UAR Copolymer Using a Two Step Process A mixture was prepared by adding 5.96 g HPA (21.7 mmole) to a solution of 102.86 g sulfonic acid catalyzed PIBSA 2300 (SAP 52.5 mg KOH/g sample, 48 mmole) and diluent oil 97.14 g in a three neck flask equipped with an overhead stirrer, heating mantle and Dean Stark trap. After heating this mixture at 160° C. for four hours, 8.6 g of the $C_{12}$–$C_{28}$ PIB/UAR copolymer from example 2 (SAP 210 mg KOH/g sample, 16 mmole) was added drop wise over 30 minutes. The PIBSA to PIB/UAR copolymer ratio was 75/25 on an anhydride basis. Then an additional 1.98 g (7.2 mmole) of HPA was added to the mixture. The mixture was then heated at 160 degrees C. overnight. The amine/anhydride CMR was 0.45. The product from this reaction had 1.30% N, and had a viscosity at 100 degrees C. of 234 cSt.

EXAMPLE 16

Soot Thickening Bench Test Results for Polysuccinimides and Post-treated Polysuccinimides Made From $C_{12}$–$C_{28}$ PIB/UAR Copolymer The polysuccinimides and post-treated polysuccinimides from Examples 8–13 were reacted in the soot thickening bench test. In this test 98.0 g of the test sample was weighed and placed into a 250-milliliter beaker. To this was added 2.0 g Vulcan XC-72R.TM. carbon black from Cabot Co. The mixture was stirred and then stored for 16 hr in a desiccator. A second sample without the carbon black, was mixed for 60 sec. using a Willems Polytron Homogenizer—Model PF 45/6 and then degased in a vacuum oven for 30 minutes at 50 to 55 degrees C. The viscosity of the two samples was then measured at 100 degrees C. using a capillary viscometer. The percent viscosity increase was calculated by comparing the viscosity of the samples with and without carbon black. Thus the lower the percent viscosity increase the better the dispersancy of the dispersant. The results from the soot thickening bench test are shown in Table 5.

TABLE 5

Table 5 includes soot thickening bench test results for polysuccinimide made from $C_{12}$–$C_{28}$ PIB/UAR copolymer. Based on the soot thickening bench tests, Examples 8–13 show that the best soot thickening results were obtained when the amine was HPA instead of TETA, and when EC post treatment was used.

| Example | Amine/anhydride CMR | Amine | EC/BN CMR | % Viscosity Increase |
|---|---|---|---|---|
| 8 | 0.525 | HPA | 0 | 100 |
| 9 | 0.525 | HPA | 2 | 29 |
| 10 | 0.5 | TETA | 0 | 267 |
| 11 | 0.5 | TETA | 2 | 135 |
| 12 | 0.5 | HPA | 0 | 111 |
| 13 | 0.5 | HPA | 2 | 36 |

EXAMPLE 17

Samples were tested in the ASTM D-5967-99A extended version (Mack T-8E) diesel engine oil test. This test evaluates the soot handling capability of a engine crankcase oil with regard to viscosity. In other words, this test evaluates a oil's ability to control viscosity increase due to soot loading in the oil. In general, a lower viscosity increase indicates superior performance.

The field service simulated was heavy-duty, stop and go operation with high-soot loading. The test engine was a Mack E7-350, fixed time, in-line six cylinder configuration 11 GBA77623, open-chamber, four-stroke, turbocharged, intercooled, compression ignition engine. The bore and stroke are 4⅞×6½ inches. The engine was rated at 350 bhp @ 1800 rpm. each test was 300 hours under constant rated speed and load conditions with controlled water out, fuel, intake air and intake manifold temperatures. Exhaust back pressure and inlet air restriction levels was also controlled. Between tests, the engine was flushed for 2 hours with the next test oil. The oil filter was also checked for plugging. Oil samples were taken every 25 hours and analyzed for kinematic viscosity at 100 degrees C. The passing limit for EO-M+ was 1.8 relative vis @ 4.8% soot; 0.5 slope at 4.8% soot; and 0.75 slope at 275 hrs or 5.8% soot. The passing limit for CH-4 was 2.1 relative vis @ 4.8% soot; 0.75 slope at 4.8% soot; and 1.0 slope at 275 hrs or 5.8% soot.

TABLE 6

Table 6 includes Mack T-8E diesel engine oil test results for fully formulated oils comprising either sample A or B, detergent, zinc dithiophosphate wear inhibitor, oxidation inhibitor, other inhibitors and other commonly used additives in a group 1 base oil with VI improver to give 15W40 type oil. Sample A is a polysuccinimide prepared from an alpha olefin copolymer in solid form and Sample B is a polysuccinimide prepared from a low molecular weight PIB/UAR copolymer of this invention. Based on the Mack T-8E diesel engine oil tests, Sample B had equivalent performance to Sample A.

| SAMPLE | A | B | EO-M+ limit | CH-4 limit |
|---|---|---|---|---|
| 250 hr Soot % | 5.4 | 5.8 | | |
| 300 hr Soot % | 6.2 | 6.9 | | |
| Relative vis @ 4.8% soot | 1.42 | 1.53 | | |
| Severity adjustment | 0.24 | 0.19 | | |
| Adjusted relative vis at 4.8% soot | 1.66 | 1.72 | 1.8 | 2.1 |
| Slope @ 4.8% soot | 0.15 | 0.38 | 0.5 | 0.75 |
| Slope @ 275 hrs or 5.8% soot | 0.31 | 0.70 | 0.75 | 1.0 |

What is claimed is:

1. One or more copolymers having the general formula:

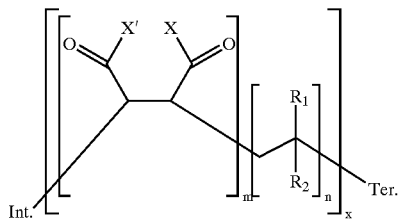

wherein:
copolymers are liquid at ambient temperature;
X and X' comprise one or more of —OH; —O—hydrocarbyl; —NH$_2$; —Cl; —Br; —OM+, wherein M+ comprises one equivalent of one or more metals, ammoniums and amine cations; and X and X' taken together as —O—;
n comprises a whole integer from 1 to 3; one of R$_1$ and R$_2$ comprises methyl and the other of R$_1$ and R$_2$ comprises polyisobutyl having about 5 to about 25 carbon atoms;
m comprises a whole integer of from 1 to 3;
x comprises a whole integer of from 1 to 20;
Int. comprises at least one initiating radical; and
Ter. comprises at least one terminating group.

2. One or more copolymers according to claim 1, wherein the copolymers comprise one or more of an amide derivative, an ester derivative, an imide derivative and a metal salt derivative.

3. One or more copolymers of claim 1 having an average degree of polymerization of about 1.1 to about 20.

4. One or more copolymers, liquid at ambient temperature, prepared by the polymerization of
a. one or more unsaturated acidic reagents and
b. one or more polyisobutenes having about 5 to about 25 carbon atoms,
c. in the presence of one or more free radical initiators.

5. One or more copolymers of claim 4 wherein the unsaturated acidic reagent comprises maleic anhydride.

6. One or more copolymers of claim 4, wherein the polyisobutene comprises a mixture further comprising:

a. about 5 wt. % to about 20 wt. % C$_8$H$_{16}$,
b. about 35 wt. % to about 55 wt. % C$_{12}$H$_{24}$,
c. about 20 wt. % to about 30 wt. % C$_{16}$H$_{32}$,
d. about 8 wt. % to about 15 wt. % C$_{20}$H$_{40}$,
e. about 2 wt % to about 8 wt % C$_{24}$H$_{48}$, and
f. about 0.5 wt % to about 2 wt. % C$_{28}$H$_{56}$.

7. One or more copolymers of claim 4 having a number average molecular weight (M$_n$) of about 231 to about 10,920.

8. One or more copolymers of claim 4 prepared from one or more polyisobutenes comprising a mixture having a number average molecular weight (M$_n$) of about 150 to about 240.

9. A method for making the copolymer of claim 1 comprising reacting one or more unsaturated acidic reagents with one or more polyisobutenes having about 5 to about 25 carbon atoms in the presence of one or more free radical initiators.

10. A method of claim 9, wherein the unsaturated acidic reagent comprises maleic anhydride.

11. A method for making one or more copolymers of claim 1 comprising a first step of reacting a first amount of one or more unsaturated acidic reagents with a first amount of one or more polyisobutenes having about 5 to about 25 carbon atoms in the presence of a first amount of one or more free radical initiators to form a first liquid copolymer and a second step of reacting a portion of the first liquid copolymer with a second amount of unsaturated acidic reagent, a second amount of polyisobutene having less than about 32 carbon atoms in the presence of a second amount of free radical initiator.

12. One or more copolymers having the general formula:

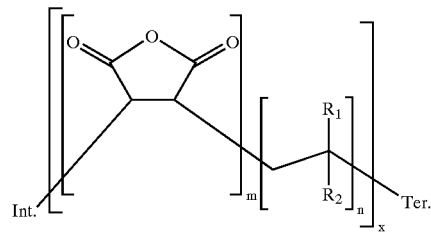

wherein:
the copolymers are liquid at ambient temperature;
n comprises a whole integer from 1 to 3;
one of R$_1$ and R$_2$ comprises methyl and the other of R$_1$ and R$_2$ comprises polyisobutyl having about 5 to about 25 carbon atoms;
m comprises a whole integer of from 1 to 3;
x comprises a whole integer of from 1 to 20;
Int. comprises one or more initiating radicals; and
Ter. comprises one or more terminating groups.

13. A method for making one or more copolymers of claim 12 comprising reacting maleic anhydride with polyisobutene having less than about 28 carbon atoms in the presence of free radical initiator.

14. One or more copolymers of claim 12 having an average degree of polymerization of about 1.1 to about 20.

15. One or more copolymers of claim 12 having an average degree of polymerization of about 1.5 to about 10.

16. A method for making the copolymers of claim 12 comprising reacting maleic anhydride with one or more polyisobutenes having about 5 to about 25 carbon atoms in the presence of one or more free radical initiators.

17. The method of claim 16 wherein the polyisobutene comprises:
a. about 5 wt. % to about 20 wt. % $C_8H_{16}$,
b. about 35 wt. % to about 55 wt. % $C_{12}H_{24}$,
c. about 20 wt. % to about 30 wt. % $C_{16}H_{32}$,
d. about 8 wt. % to about 15 wt. % $C_{20}H_{40}$,
e. about 2 wt % to about 8 wt % $C_{24}H_{48}$, and
f. about 0.5 wt % to about 2 wt. % $C_{28}H_{56}$.

18. One or more copolymers of claim 12 having a number average molecular weight ($M_n$) of about 231 to about 10,920.

19. A method of claim 16, wherein the polyisobutene has a number average molecular weight ($M_n$) of about 150 to about 240.

20. A method for making one or more copolymer comprising reacting polyisobutene having about 5 to about 25 carbon atoms with maleic anhydride in the presence of one or more free radical initiators and one or more copolymers of claim 12.

21. A method for making one or more copolymers of claim 12 comprising a first step of reacting a first amount of maleic anhydride with a first amount of one or more polyisobutenes having about 5 to about 25 carbon atoms in the presence of a first amount of one or more free radical initiators to form a first liquid copolymer and a second step of reacting a portion of the first liquid copolymer with a second amount of maleic anhydride and a second amount of one or more polyisobutenes having about 5 to about 25 carbon atoms in the presence of a second amount of one or more free radical initiators.

22. One or more polymers having the general formula of:

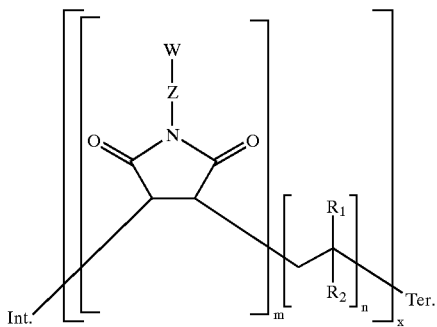

wherein:
W comprises one or more of:

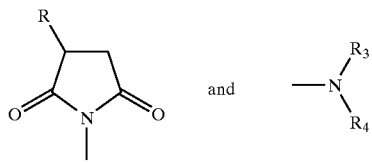

wherein:
R comprises at least one of one or more polyalkyls and one or more polyalkenes, wherein the polyalkyls and polyalkenes each have a molecular weight of at least 1000;
one of $R_1$ and $R_2$ comprises methyl and the other of $R_1$ and $R_2$ comprises polyisobutyl having about 5 to about 25 carbon atoms;
Z comprises a polyamine linking radical
m comprises a whole integer of from 1 to 3;
n comprises a whole integer of from 1 to 3;
x comprises a whole integer of from 1 to 20;
Int. comprises one or more initiating radicals;
Ter. comprises one or more terminating groups; and
wherein $R_3$ and $R_4$ are independently hydrogen, alkyl, phenyl, or taken together are alkylene to give a ring group.

23. A lubricating oil composition comprising a major amount of an oil of lubricating viscosity and a minor amount of one or more of the polymers of claim 22.

24. A lubricating oil concentrate comprising from about 10 wt.% to about 90 wt. % of the polymer of claim 22 and from about 90 wt. % to about 10 wt. % of an oil of lubricating viscosity.

25. A fuel concentrate comprising a major amount of an inert stable oleophilic organic solvent boiling in the range of about 150 degrees F. to about 400 degrees F. and a minor amount of the polymer of claim 22.

26. One or more post-treated dispersants prepared by treating one or more polymers of claim 22 with one or more cyclic carbonate or one or more linear mono- or polycarbonate under reactive conditions.

27. The post-treated dispersants of claim 26 wherein said cyclic carbonate is ethylene carbonate.

28. A lubricating oil composition comprising a major amount of an oil of lubricating viscosity and a minor amount of the dispersant of claim 26.

29. A lubricating oil concentrate comprising from about 10 wt. % to about 90 wt. % of the post-treated dispersant of claim 26 and from about 90 wt. % to about 10 wt. % of an oil of lubricating viscosity.

30. One or more post-treated dispersants prepared by treating the polymers of claim 26 under reactive conditions with one or more of boron oxide, boron halide, boric acid, and esters of boric acid.

31. A process for preparing one or more succinimides that comprises reacting a mixture under reactive conditions, wherein the mixture comprises:
a. one or more of at least one alkenyl acid derivative and at least one alkylsuccinic acid derivative,
b. one or more copolymers prepared by the process of claim 9 and
c. one or more polyamines.

32. A process for preparing one or more succinimides of claim 31, wherein the acid derivative has a succination ratio of from about 1.1 to about 1.4.

33. One or more succinimides prepared by reacting a mixture under reactive conditions wherein the mixture comprises:
a. one or more of an alkenyl acid derivative and an alkylsuccinic acid derivative,
b. one or more copolymers of
(1) one or more unsaturated acidic reagents and
(2) one or more polyisobutenes having about 5 to about 25 carbon atoms, and
c. one or more polyamine.

34. One or more succinimides of claim 33, wherein the acid derivatives have a succination ratio of about from about 1.1 to about 1.4.

35. One or more succinimides of claim 33, wherein the unsaturated acidic reagent comprises maleic anhydride.

36. A lubricating oil composition comprising a major amount of an oil of lubricating viscosity and a minor amount of the succinimide of claim 33.

37. A lubricating oil concentrate comprising from about 10 wt. % to about 90 wt. % of the succinimide of claim 33 and from about 90 wt. % to about 10 wt. % of an oil of lubricating viscosity.

38. A fuel concentrate comprising a major amount of an inert stable oleophilic organic solvent boiling in the range of about 150 degrees F. to about 400 degrees F. and a minor amount of the succinimide of claim 33.

39. One or more post-treated succinimides prepared by treating one or more succinimides of claim 33 under reactive conditions with one or more of linear mono- carbonate and poly-carbonate.

40. The post-treated succinimide of claim 39, wherein the carbonate comprises ethylene carbonate.

41. A lubricating oil comprising a major amount of an oil of lubricating viscosity and a minor amount of the post-treated succinimide of claim 39.

42. A lubricating oil concentrate comprising from about 10 wt. % to about 90 wt. % of the post-treated succinimide of claim 39 and from about 90 wt. % to about 10 wt. % of an oil of lubricating viscosity.

43. A fuel concentrate comprising a major amount of an inert stable oleophilic organic solvent boiling in the range of about 150 degrees F. to about 400 degrees F. and a minor amount of the post-treated succinimide of claim 39.

44. One or more post-treated succinimides prepared by treating the succinimides of claim 33 under reactive conditions with one or more of boron oxide, boron halide, boric acid, and esters of boric acid.

45. A lubricating oil comprising a major amount of an oil of lubricating viscosity and a minor amount of the post-treated succinimide of claim 44.

46. A fuel concentrate comprising a major amount of an inert stable oleophilic organic solvent boiling in the range of about 150 degrees F. to about 400 degrees F. and a minor amount of the post-treated succinimide of claim 44.

* * * * *